US011360463B2

(12) United States Patent
Al Matouq

(10) Patent No.: US 11,360,463 B2
(45) Date of Patent: Jun. 14, 2022

(54) DYNAMIC ONLINE PROCESS FLOW DIAGRAMING

(71) Applicant: Saudi Arabian Oil Company, Dhahran (SA)

(72) Inventor: Hassan Mohammadali Al Matouq, Al Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 198 days.

(21) Appl. No.: 16/902,598

(22) Filed: Jun. 16, 2020

(65) Prior Publication Data

US 2021/0389756 A1 Dec. 16, 2021

(51) Int. Cl.
*G05B 19/418* (2006.01)
*G05B 19/406* (2006.01)

(52) U.S. Cl.
CPC ..... *G05B 19/41865* (2013.01); *G05B 19/406* (2013.01); *G05B 2219/31449* (2013.01)

(58) Field of Classification Search
None
See application file for complete search history.

(56) References Cited

U.S. PATENT DOCUMENTS 5,596,704 A 1/1997 Geddes et al.
6,442,512 B1 * 8/2002 Sengupta ............... G06F 9/451
703/2

(Continued)

FOREIGN PATENT DOCUMENTS

CN 101894301 A 11/2010
CN 105959157 A 9/2016
CN 109190326 A 1/2019

OTHER PUBLICATIONS

CAU Department of Computer Science; "Welcome to the KIELER Project—Real-Time and Embedded Systems" available as of Jun. 16, 2020 at: https://www.rtsys.informatik.uni-kiel.de/en/research/kieler/welcome-to-the-kieler-project; pp. 1-4.

(Continued)

*Primary Examiner* — Jason Lin
(74) *Attorney, Agent, or Firm* — Bracewell LLP; Constance G. Rhebergen; Christopher L. Drymalla

(57) ABSTRACT

Provided are embodiments of monitoring an industrial process that include determining a process structural model that defines operational characteristics of equipment used to perform the industrial process, determining an interface application to display a process flow diagram (PFD) for the process, obtaining an interface model for the interface application, determining (based on the process structural model) a grouped process structural model for the process, determining (based on the grouped process structural model) a routed process model for the process, and generating (based on the routed process model) the PFD for the process. The determining of the grouped process structural model including grouping sensors with associated process equipment, grouping process equipment, and grouping connections between pieces of equipment to determine an edge-grouped process structural model for the industrial process, and incorporating the interface model with the edge-grouped process structural model to determine the grouped process structural model.

21 Claims, 19 Drawing Sheets

(56) References Cited

U.S. PATENT DOCUMENTS

| | | | |
|---|---|---|---|
| 6,980,211 | B2 | 12/2005 | Lin et al. |
| 9,875,235 | B1 | 1/2018 | Das et al. |
| 2003/0083756 | A1* | 5/2003 | Hsiung ............... G05B 23/0221 700/28 |
| 2004/0103375 | A1 | 5/2004 | Chen et al. |
| 2009/0089115 | A1 | 4/2009 | Murthy |
| 2012/0019535 | A1* | 1/2012 | Miyashita ............. G06T 11/206 345/440 |
| 2013/0278638 | A1 | 10/2013 | Yoshikawa et al. |
| 2014/0129000 | A1* | 5/2014 | Block ................... G06F 11/008 700/79 |
| 2015/0169190 | A1* | 6/2015 | Girardeau ........... G06F 3/04817 715/771 |
| 2017/0132332 | A1 | 5/2017 | Takamura et al. |
| 2018/0143756 | A1* | 5/2018 | Mildrew ............... G06F 3/0482 |
| 2019/0138971 | A1* | 5/2019 | Uggirala ............... G06F 16/904 |

OTHER PUBLICATIONS

Esquivel, Esteban Arroyo; "Capturing and Exploiting Plant Topology and Process Information as a Basis to Support Engineering and Operational Activities in Process Plants" Dissertation: Helmut Schmidt Universitat (2017); pp. 1-203.

Fuhrmann, Hauke et al.; "Automatic Layout and Structure-Based Editing of UML Diagrams" Real-Time and Embedded Systems Group, Department of Computer Science Christian-Albrechts-Universitat (2010); pp. 1-6.

Hoernicke, Mario et al.; "Anlagentopologien automatisch erstellen" atp edition 56.04 (2014); pp. 28-40.

Microsoft "Automatically create process diagrams in Visio from Excel data" Visio team, May 1, 2017; available as of May 4, 2019 at: https://www.microsoft.com/en-us/microsoft-365/blog/2017/05/01/automatically-create-process-diagrams-in-visio-from-excel-data/.

Sponemann, Miro; "On the Automatic Layout of Data Flow Diagrams" Christian-Albrechts-Universitat Zu Kiel, Diploma Thesis, Mar. 19, 2009, Department of Computer Science Real-Time and Embedded Systems Group; pp. 1-96.

YWorks—The Diagramming Company; available as of Jun. 4, 2019 at: https://www.yworks.com; pp. 1-3.

Fleischmann, Hans et al.; "Automated Generation of Human-Machine Interfaces in Electric Drives Manufacturing" 2017 7th International Eleclric Drives Production Conference (EDPC), Dec. 5, 2017; pp. 1-8.

IEC International Standard; "Engineering data exchange format for use in industrial automation systems engineering—Automation markup language—Part 1: Architecture and general requirements" IEC 62714-1, Edition 2.0 Apr. 30, 2018 pp. 1-171.

International Search Report and Written Opinion for International Application No. PCT/US2021/037654, report dated Sep. 27, 2021; pp. 1-17.

Martin, Christopher et al.; "Integrated Design of Human-Machine Interfaces for Production Plants" 2015 IEEE 20th Conference on Emerging Technologies & Factory Automation (ETFA), IEEE Sep. 8, 2015; pp. 1-6.

Urbas, Leon et al.; "Towards context adaptive HMIs in process industries" Industrial Informatice (INDIN) 2011 9th IEEE International Conference, Jul. 26, 2011; pp. 244-249.

* cited by examiner

Process Structural Model:

Name: Inlet1
    Equipment Type: Inlet
    Text: Input 1
    Inlet/Source: N/A
    Outlet/Destination: InletValve
    Sensor: None Name: InletValve1
    Equipment Type: Valve
    Text: Input Valve
    Inlet/Source: Inlet1
    Outlet/Destination: Drum1
    Sensor: None Name: Drum1
    Equipment Type: Vertical Tank
    Text: Drum 1
    Inlet/Source: InletValve
    Outlet/Destination: Pump1; Pump2; Pump3
    Sensor: Drum1LevelSens Name: Pump1
    Equipment Type: Pump
    Text: Pump 1
    Inlet/Source: Drum1; Drum2; Inlet2
    Outlet/Destination: Cooler1; Drum2
    Sensor: Pump1Sensor Name: Pump2
    Equipment Type: Pump
    Text: Pump 2
    Inlet/Source: Drum1; Drum2; Inlet2
    Outlet/Destination: Cooler1; Drum2
    Sensor: Pump2Sensor Name: Pump3
    Equipment Type: Pump
    Text: Pump 3
    Inlet/Source: Drum1; Drum2; Inlet2
    Outlet/Destination: Cooler1; Drum2
    Sensor: Pump3Sensor Name: Cooler1
    Equipment Type: Cooler
    Text: Cooler 1
    Inlet/Source: Pump1; Pump2; Pump3
    Outlet/Destination: Outlet1
    Sensor: Cooler1Sensor Name: Drum2
    Equipment Type: Vertical Tank
    Text: Drum 2
    Inlet/Source: Pump1; Pump2; Pump3
    Outlet/Destination: Pump1; Pump2; Pump3
    Sensor: Drum2LevelSensor Name: Inlet2
    Equipment Type: Inlet
    Text: Input 2
    Inlet/Source: N/A
    Outlet/Destination: Pump1; Pump2; Pump3
    Sensor: None Name: Outlet1
    Equipment Type: Outlet
    Text: Output
    Inlet/Source: Cooler1
    Outlet/Destination: N/A
    Sensor: None Name: Pump1Sensor
    Equipment Type: Sensor - Flow
    Unit: True/False
    SCADA Tag: A#3458

Name: Pump2Sensor
    Equipment Type: Sensor - Flow
    Unit: True/False
    SCADA Tag: A#3454

Name: Pump3Sensor
    Equipment Type: Sensor - Flow
    Unit: True/False
    SCADA Tag: A#3452

Name: Drum1LevelSens
    Equipment Type: Sensor - Level
    Unit: %
    SCADA Tag: A#3451

Name: Drum2LevelSens
    Equipment Type: Sensor - Level
    Unit: %
    SCADA Tag: A#3457

Name: Cooler1Sensor
    Equipment Type: Sensor - AirFlow
    Unit: True/False
    SCADA Tag: A#3459

Process Flow Diagram Interface Model:
Equipment Type: Inlet
    Image: Inlet.png
    Width: 20
    Height: 20
    Port Constraint: Fixed_Side
        Inlet: West
        Outlet: East
Equipment Type: Outlet
    Image: Outlet.png
    Width: 20
    Height: 20
    Port Constraint: Fixed_Side
        Inlet: East
        Outlet: West
Equipment Type: Valve
    Image: Valve.png
    Width: 20
    Height: 20
    Port Constraint: Fixed_Side
        Inlet: West
        Outlet: East
Equipment Type: Vertical Tank
    Image: VertTank.png
    Width: 20
    Height: 30
    Port Constraint: None
Equipment Type: Pump
    Image: Pump.png
    Width: 20
    Height: 20
    Port Constraint: Fixed_Side
        Inlet: West
        Outlet: East
Equipment Type: Cooler
    Image: Cooler.png
    Width: 20
    Height: 20
    Port Constraint: Fixed_Side
        Inlet: West
        Outlet: East Equipment Type: Sensor - Level
    Image: Flowsensor.png
    Width: 20
    Height: 20
    TagnameoffsetX: 20
    TagnameoffsetY: 40
    UnitoffsetX: 70
    UnitoffsetY: 10
    ReadingoffsetX: 10
    ReadingoffsetY: 10
Equipment Type: Sensor - Flow
    Image: Flowsensor.png
    Width: 20
    Height: 20
    ColorTrue: green
    ColorFalse: red Equipment Type: Sensor - AirFlow
    Image: AirFlowsensor.png
    Width: 20
    Height: 20
    ColorTrue: green
    ColorFalse: red Equipment Type: Junction
    Image: Junction.png
    Width: 1
    Height: 1

FIG. 4B

Sensor-Grouped Process Structural Model:

Name: Inlet1
    Equipment Type: Inlet
    Text: Input 1
    Inlet/Source: N/A
    Outlet/Destination: InletValve
    Sensor: None Name: InletValve1
    Equipment Type: Valve
    Text: Input Valve
    Inlet/Source: Inlet1
    Outlet/Destination: Drum1
    Sensor: None Name: Drum1
    Equipment Type: Vertical Tank
    Text: Drum 1
    Inlet/Source: InletValve
    Outlet/Destination: Pump1; Pump2; Pump3
    Sensor: Drum1LevelSens
        Name: Drum1LevelSens
            Equipment Type: Sensor - Level
            Unit: %
            SCADA Tag: A#3451

Name: Pump1
    Equipment Type: Pump
    Text: Pump 1
    Inlet/Source: Drum1; Drum2; Inlet2
    Outlet/Destination: Cooler1; Drum2
    Sensor: Pump1Sensor
        Name: Pump1Sensor
            Equipment Type: Sensor - Flow
            Unit: True/False
            SCADA Tag: A#3458

Name: Pump2
    Equipment Type: Pump
    Text: Pump 2
    Inlet/Source: Drum1; Drum2; Inlet2
    Outlet/Destination: Cooler1; Drum2
    Sensor: Pump2Sensor
        Name: Pump2Sensor
            Equipment Type: Sensor - Flow
            Unit: True/False
            SCADA Tag: A#3454

Name: Pump3
    Equipment Type: Pump
    Text: Pump 3
    Inlet/Source: Drum1; Drum2; Inlet2
    Outlet/Destination: Cooler1; Drum2
    Sensor: Pump3Sensor
        Name: Pump3Sensor
            Equipment Type: Sensor - Flow
            Unit: True/False
            SCADA Tag: A#3452

Name: Cooler1 ← 504
    Equipment Type: Cooler
    Text: Cooler 1
    Inlet/Source: Pump1; Pump2; Pump3
    Outlet/Destination: Outlet1
    Sensor: Cooler1Sensor
        Name: Cooler1Sensor
            Equipment Type: Sensor - AirFlow
            Unit: True/False
            SCADA Tag: A#3459

Name: Drum2
    Equipment Type: Vertical Tank
    Text: Drum 2
    Inlet/Source: Pump1; Pump2; Pump3
    Outlet/Destination: Pump1; Pump2; Pump3
    Sensor: Drum2LevelSensor
        Name: Drum2LevelSens
            Equipment Type: Sensor - Level
            Unit: %
            SCADA Tag: A#3457

Name: Inlet2
    Equipment Type: Inlet
    Text: Input 2
    Inlet/Source: N/A
    Outlet/Destination: Pump1; Pump2; Pump3
    Sensor: None Name: Outlet1
    Equipment Type: Outlet
    Text: Output
    Inlet/Source: Cooler1
    Outlet/Destination: N/A
    Sensor: None

FIG. 7A

Equipment-Grouped Process Structural Model:
Name: Inlet1
    Equipment Type: Inlet
    Text: Input 1
    Inlet/Source: N/A
    Outlet/Destination: InletValve
    Sensor: None
Name: InletValve1
    Equipment Type: Valve
    Text: Input Valve
    Inlet/Source: Inlet1
    Outlet/Destination: Drum1
    Sensor: None
Name: Drum1
    Equipment Type: Vertical Tank
    Text: Drum 1
    Inlet/Source: InletValve
    Outlet/Destination: Pump1; Pump2; Pump3
    Sensor: Drum1LevelSens
        Name: Drum1LevelSens
            Equipment Type: Sensor - Level
            Unit: %
            SCADA Tag: A#3451
Name: Pump1, Pump2, Pump3 Group
    Name: Pump1
        Equipment Type: Pump
        Text: Pump Group
        Inlet/Source: Drum1; Drum2; Inlet2
        Outlet/Destination: Cooler1; Drum2
        Sensor: Pump1Sensor
            Name: Pump1Sensor
                Equipment Type: Sensor - Flow
                Unit: True/False
                SCADA Tag: A#3458
    Name: Pump2
        Equipment Type: Pump
        Text: Pump 2
        Inlet/Source: Drum1; Drum2; Inlet2
        Outlet/Destination: Cooler1; Drum2
        Sensor: Pump2Sensor
            Name: Pump2Sensor
                Equipment Type: Sensor - Flow
                Unit: True/False
                SCADA Tag: A#3454
    Name: Pump3
        Equipment Type: Pump
        Text: Pump 3
        Inlet/Source: Drum1; Drum2; Inlet2
        Outlet/Destination: Cooler1; Drum2
        Sensor: Pump3Sensor
            Name: Pump3Sensor
                Equipment Type: Sensor - Flow
                Unit: True/False
                SCADA Tag: A#3452

← 508

Name: Cooler1
    Equipment Type: Cooler
    Text: Cooler 1
    Inlet/Source: Pump1; Pump2; Pump3
    Outlet/Destination: Outlet1
    Sensor: Cooler1Sensor
        Name: Cooler1Sensor
            Equipment Type: Sensor - AirFlow
            Unit: True/False
            SCADA Tag: A#3459
Name: Drum2
    Equipment Type: Vertical Tank
    Text: Drum 2
    Inlet/Source: Pump1; Pump2; Pump3
    Outlet/Destination: Pump1; Pump2; Pump3
    Sensor: Drum2LevelSensor
        Name: Drum2LevelSens
            Equipment Type: Sensor - Level
            Unit: %
            SCADA Tag: A#3457
Name: Inlet2
    Equipment Type: Inlet
    Text: Input 2
    Inlet/Source: N/A
    Outlet/Destination: Pump1; Pump2; Pump3
    Sensor: None
Name: Outlet1
    Equipment Type: Outlet
    Text: Output
    Inlet/Source: Cooler1
    Outlet/Destination: N/A
    Sensor: None

FIG. 7B

Edge-Grouped Process Structural Model:
Name:  Inlet1
      Equipment Type: Inlet
      Text: Input 1
      Inlet/Source: N/A
      Outlet/Destination: InletValve
      Sensor: None
Name:  InletValve1
      Equipment Type: Valve
      Text: Input Valve
      Inlet/Source: Inlet1
      Outlet/Destination: Drum1
      Sensor: None
Name:  Drum1
      Equipment Type: Vertical Tank
      Text: Drum 1
      Inlet/Source: InletValve
      Outlet/Destination: Junction1
      Sensor: Drum1LevelSens
            Name: Drum1LevelSens
                  Equipment Type: Sensor - Level
                  Unit: %
                  SCADA Tag: A#3451
Name:  Pump1, Pump2, Pump3 Group
      Name:  Pump1
            Equipment Type: Pump
            Text: Pump Group
            Inlet/Source: Junction3
            Outlet/Destination: Junction4
            Sensor: Pump1Sensor
                  Name: Pump1Sensor
                        Equipment Type: Sensor - Flow
                        Unit: True/False
                        SCADA Tag: A#3458
      Name:  Pump2
            Equipment Type: Pump
            Text: Pump 2
            Inlet/Source: Junction3
            Outlet/Destination: Junction4
            Sensor: Pump2Sensor
                  Name: Pump2Sensor
                        Equipment Type: Sensor - Flow
                        Unit: True/False
                        SCADA Tag: A#3454
      Name:  Pump3
            Equipment Type: Pump
            Text: Pump 3
            Inlet/Source: Junction3
            Outlet/Destination: Junction4
            Sensor: Pump3Sensor
                  Name: Pump3Sensor
                        Equipment Type: Sensor - Flow
                        Unit: True/False
                        SCADA Tag: A#3452

⟵ 512

Name:  Cooler1
      Equipment Type: Cooler
      Text: Cooler 1
      Inlet/Source: Junction2
      Outlet/Destination: Outlet1
      Sensor: Cooler1Sensor
            Name: Cooler1Sensor
                  Equipment Type: Sensor
            - AirFlow
                  Unit: True/False
                  SCADA Tag: A#3459
Name:  Drum2
      Equipment Type: Vertical Tank
      Text: Drum 2
      Inlet/Source: Junction2
      Outlet/Destination: Junction1
      Sensor: Drum2LevelSensor
            Name: Drum2LevelSens
                  Equipment Type: Sensor
            - Level
                  Unit: %
                  SCADA Tag: A#3457
Name:  Inlet2
      Equipment Type: Inlet
      Text: Input 2
      Inlet/Source: N/A
      Outlet/Destination: Junction1
      Sensor: None
Name: Outlet1
      Equipment Type: Outlet
      Text: Output
      Inlet/Source: Cooler1
      Outlet/Destination: N/A
      Sensor: None
Name: Junction1
      Equipment Type: Junction
      Text: None
      Inlet/Source: Drum1; Drum2; Inlet2
      Outlet/Destination: Junction3
      Sensor: None
Name: Junction2
      Equipment Type: Junction
      Text: None
      Inlet/Source: Junction4
      Outlet/Destination: Cooler1; Drum2
      Sensor: None
Name: Junction3
      Equipment Type: Junction
      Text: None
      Inlet/Source: Junction1
      Outlet/Destination: Pump1; Pump2; Pump3
      Sensor: None

FIG. 7C

Name: Junction2
    Equipment Type: Junction
    Text: None
    Inlet/Source: Pump1; Pump2; Pump3
    Outlet/Destination: Junction2
    Sensor: None
Name: Edge1
    Equipment Type: Edge
    Text: None
    Inlet/Source: Inlet1
    Outlet/Destination: InletValve1
    Sensor: None
Name: Edge2
    Equipment Type: Edge
    Text: None
    Inlet/Source: InletValve1
    Outlet/Destination: Drum1
    Sensor: None
Name: Edge3
    Equipment Type: Edge
    Text: None
    Inlet/Source: Drum1
    Outlet/Destination: Junction3
    Sensor: None
Name: Edge4
    Equipment Type: Edge
    Text: None
    Inlet/Source: Junction1
    Outlet/Destination: Junction3
    Sensor: None
Name: Edge5
    Equipment Type: Edge
    Text: None
    Inlet/Source: Inlet2
    Outlet/Destination: Junction1
    Sensor: None
Name: Edge6
    Equipment Type: Edge
    Text: None
    Inlet/Source: Drum2
    Outlet/Destination: Junction1
    Sensor: None
Name: Edge7
    Equipment Type: Edge
    Text: None
    Inlet/Source: Junction4
    Outlet/Destination: Junction2
    Sensor: None
Name: Edge8
    Equipment Type: Edge
    Text: None
    Inlet/Source: Junction2
    Outlet/Destination: Cooler1
    Sensor: None Name: Edge9   ← 512
    Equipment Type: Edge
    Text: None
    Inlet/Source: Junction2
    Outlet/Destination: Drum2
    Sensor: None
Name: Edge10
    Equipment Type: Edge
    Text: None
    Inlet/Source: Cooler1
    Outlet/Destination: Outlet1
    Sensor: None
Name: Edge11
    Equipment Type: Edge
    Text: None
    Inlet/Source: Junction3
    Outlet/Destination: Pump1
    Sensor: None
Name: Edge12
    Equipment Type: Edge
    Text: None
    Inlet/Source: Junction3
    Outlet/Destination: Pump2
    Sensor: None
Name: Edge13
    Equipment Type: Edge
    Text: None
    Inlet/Source: Junction3
    Outlet/Destination: Pump3
    Sensor: None
Name: Edge14
    Equipment Type: Edge
    Text: None
    Inlet/Source: Pump1
    Outlet/Destination: Junction4
    Sensor: None
Name: Edge14
    Equipment Type: Edge
    Text: None
    Inlet/Source: Pump2
    Outlet/Destination: Junction4
    Sensor: None
Name: Edge15
    Equipment Type: Edge
    Text: None
    Inlet/Source: Pump3
    Outlet/Destination: Junction4
    Sensor: None

Grouped Process Structural Model:
Name: Inlet1
    Equipment Type: Inlet
        Image: Inlet.png
        Width: 20
        Height: 20
        Port Constraint: Fixed_Side
            Inlet: West
            Outlet: East
    Text: Input 1
    Inlet/Source: N/A
    Outlet/Destination: InletValve
    Sensor: None
Name: InletValve1
    Equipment Type: Valve
        Image: Valve.png
        Width: 20
        Height: 20
        Port Constraint: Fixed_Side
            Inlet: West
            Outlet: East
    Text: Input Valve
    Inlet/Source: Inlet1
    Outlet/Destination: Drum1
    Sensor: None
Name: Drum1
    Equipment Type: Vertical Tank
        Image: VertTank.png
        Width: 20
        Height: 30
        Port Constraint: None
    Text: Drum 1
    Inlet/Source: InletValve
    Outlet/Destination: Junction1
    Sensor: Drum1LevelSens
        Name: Drum1LevelSens
            Equipment Type: Sensor – Level
                Image: Flowsensor.png
                Width: 20
                Height: 20
                TagnameoffsetX: 20
                TagnameoffsetY: 40
                UnitoffsetX: 70
                UnitoffsetY: 10
                ReadingoffsetX: 10
                ReadingoffsetY: 10
            Unit: %
            SCADA Tag: A#3451

Name: Pump1, Pump2, Pump3 Group
    Name: Pump1
        Equipment Type: Pump
            Image: Pump.png
            Width: 20
            Height: 20
            Port Constraint: Fixed_Side
                Inlet: West
                Outlet: East
        Text: Pump Group
        Inlet/Source: Junction3
        Outlet/Destination: Junction4
        Sensor: Pump1Sensor
            Name: Pump1Sensor
                Equipment Type: Sensor – Flow
                    Image: Flowsensor.png
                    Width: 20
                    Height: 20
                    ColorTrue: green
                    ColorFalse: red
                Unit: True/False
                SCADA Tag: A#3458
    Name: Pump2
        Equipment Type: Pump
            Image: Pump.png
            Width: 20
            Height: 20
            Port Constraint: Fixed_Side
                Inlet: West
                Outlet: East
        Text: Pump 2
        Inlet/Source: Junction3
        Outlet/Destination: Junction4
        Sensor: Pump2Sensor
            Name: Pump2Sensor
                Equipment Type: Sensor – Flow
                    Image: Flowsensor.png
                    Width: 20
                    Height: 20
                    ColorTrue: green
                    ColorFalse: red
                Unit: True/False
                SCADA Tag: A#3454

FIG. 7D

Name: Pump3
Equipment Type: Pump
Image: Pump.png
Width: 20
Height: 20
Port Constraint: Fixed_Side
Inlet: West
Outlet: East
Text: Pump 3
Inlet/Source: Junction3
Outlet/Destination: Junction4
Sensor: Pump3Sensor
Name: Pump3Sensor
Equipment Type: Sensor – Flow
Image: Flowsensor.png
Width: 20
Height: 20
ColorTrue: green
ColorFalse: red
Unit: True/False
SCADA Tag: A#3452

Name: Cooler1
Equipment Type: Cooler
Image: Cooler.png
Width: 20
Height: 20
Port Constraint: Fixed_Side
Inlet: West
Outlet: East
Text: Cooler 1
Inlet/Source: Junction2
Outlet/Destination: Outlet1
Sensor: Cooler1Sensor
Name: Cooler1Sensor
Equipment Type: Sensor – AirFlow
Image: AirFlowsensor.png
Width: 20
Height: 20
ColorTrue: green
ColorFalse: red
Unit: True/False
SCADA Tag: A#3459

⟋ 212

Name: Drum2
Equipment Type: Vertical Tank
Image: VertTank.png
Width: 20
Height: 30
Port Constraint: None
Text: Drum 2
Inlet/Source: Junction2
Outlet/Destination: Junction1
Sensor: Drum2LevelSensor
Name: Drum2LevelSens
Equipment Type: Sensor – Level
Image: Flowsensor.png
Width: 20
Height: 20
TagnameoffsetX: 20
TagnameoffsetY: 40
UnitoffsetX: 70
UnitoffsetY: 10
ReadingoffsetX: 10
ReadingoffsetY: 10
Unit: %
SCADA Tag: A#3457

Name: Inlet2
Equipment Type: Inlet
Image: Inlet.png
Width: 20
Height: 20
Port Constraint: Fixed_Side
Inlet: West
Outlet: East
Text: Input 2
Inlet/Source: N/A
Outlet/Destination: Junction1
Sensor: None Name: Outlet1
Equipment Type: Outlet
Image: Outlet.png
Width: 20
Height: 20
Port Constraint: Fixed_Side
Inlet: East
Outlet: West
Text: Output
Inlet/Source: Cooler1
Outlet/Destination: N/A
Sensor: None FIG. 7D
(Continued)

Name: Junction1
    Equipment Type: Junction
        Image: Junction.png
        Width: 1
        Height: 1
    Text: None
    Inlet/Source: Drum1; Drum2; Inlet2
    Outlet/Destination: Junction1
    Sensor: None
Name: Junction2
    Equipment Type: Junction
        Image: Junction.png
        Width: 1
        Height: 1
    Text: None
    Inlet/Source: Junction4
    Outlet/Destination: Cooler1; Drum2
    Sensor: None
Name: Junction3
    Equipment Type: Junction
        Image: Junction.png
        Width: 1
        Height: 1
    Text: None
    Inlet/Source: Junction1
    Outlet/Destination: Pump1; Pump2; Pump3
    Sensor: None
Name: Junction4
    Equipment Type: Junction
        Image: Junction.png
        Width: 1
        Height: 1
    Text: None
    Inlet/Source: Pump1; Pump2; Pump3
    Outlet/Destination: Junction2
    Sensor: None
Name: Edge1
    Equipment Type: Edge
    Text: None
    Inlet/Source: Inlet1
    Outlet/Destination: InletValve1
    Sensor: None
Name: Edge2
    Equipment Type: Edge
    Text: None
    Inlet/Source: InletValve1
    Outlet/Destination: Drum1
    Sensor: None
Name: Edge3
    Equipment Type: Edge
    Text: None
    Inlet/Source: Drum1
    Outlet/Destination: Junction3
    Sensor: None Name: Edge4  ⟵ 212
    Equipment Type: Edge
    Text: None
    Inlet/Source: Junction1
    Outlet/Destination: Junction3
    Sensor: None
Name: Edge5
    Equipment Type: Edge
    Text: None
    Inlet/Source: Inlet2
    Outlet/Destination: Junction1
    Sensor: None
Name: Edge6
    Equipment Type: Edge
    Text: None
    Inlet/Source: Drum2
    Outlet/Destination: Junction1
    Sensor: None
Name: Edge7
    Equipment Type: Edge
    Text: None
    Inlet/Source: Junction4
    Outlet/Destination: Junction2
    Sensor: None
Name: Edge8
    Equipment Type: Edge
    Text: None
    Inlet/Source: Junction2
    Outlet/Destination: Cooler1
    Sensor: None
Name: Edge9
    Equipment Type: Edge
    Text: None
    Inlet/Source: Junction2
    Outlet/Destination: Drum2
    Sensor: None
Name: Edge10
    Equipment Type: Edge
    Text: None
    Inlet/Source: Cooler1
    Outlet/Destination: Outlet1
    Sensor: None
Name: Edge11
    Equipment Type: Edge
    Text: None
    Inlet/Source: Junction3
    Outlet/Destination: Pump1
    Sensor: None
Name: Edge12
    Equipment Type: Edge
    Text: None
    Inlet/Source: Junction3
    Outlet/Destination: Pump2
    Sensor: None FIG. 7D
(Continued)

Name: Edge13
    Equipment Type: Edge
    Text: None
    Inlet/Source: Junction3
    Outlet/Destination: Pump3
    Sensor: None
Name: Edge14
    Equipment Type: Edge
    Text: None
    Inlet/Source: Pump1
    Outlet/Destination: Junction4
    Sensor: None
Name: Edge15
    Equipment Type: Edge
    Text: None
    Inlet/Source: Pump2
    Outlet/Destination: Junction4
    Sensor: None
Name: Edge16
    Equipment Type: Edge
    Text: None
    Inlet/Source: Pump3
    Outlet/Destination: Junction4
    Sensor: None

Routed Process Model:

[1] ← 216
    Type: Node
    Equipment Type: Inlet
    ID: Inlet1
    Text: Input 1
    Image: Inlet.png
    Width : 20
    Height : 20
    X: 92
    Y: 76
    .
    .
    .

[15]
    Type = Edge
    Equipment Type = Edge
    ID = Edge1
    Text: None
    Source: Inlet1
    SourcePort: Inlet1_Out1
    SourcePoint:
        X: 172
        Y: 126
    Target/Destination: InletValve1
    Target/DeistaintionPort: InletVlave1_In1
    Target/Destination Point:
        X: 277
        Y: 204
    .
    .
    .

FIG. 7E

DYNAMIC ONLINE PROCESS FLOW DIAGRAMING

FIELD

Embodiments relate generally to industrial process facilities and, more particularly, to dynamic generation of process flow diagrams for industrial processes.

BACKGROUND

Industrial process facilities (or "plants") typically facilitate chemical, physical, electrical or mechanical steps for manufacturing items. For example, a chemical plant is a type of industrial process facility that creates new material through processes that involves chemical or biological transformation or separation of materials. As another example, a petrochemical plant is a type of industrial process facility that employs processes to convert natural resources, such as crude oil, natural gas, ores and minerals, into products, such as ethylene, propylene, butadiene, and aromatics. As yet another example, a hydrocarbon refinery (or "oil refinery") is a type of industrial process facility that employs processes to refine crude oil into more useful products, such as petroleum naphtha, gasoline, diesel fuel, asphalt base, heating oil, kerosene, liquefied petroleum gas, jet fuel and fuel oils.

In many instances, industrial process facilities operate on a large scale with a variety of complex processes running in parallel. For example, a hydrocarbon refinery may have distillation, cracking, treatment and other processes running simultaneously to convert crude oil into gasoline and other products. These types of processes typically rely on individual pieces of processing equipment working in coordination to complete various processing operations. For example, a crude oil distillation process may involve pumps, valves, vessels, heating/cooling systems, and piping of a crude oil distillation unit (CDU) working in conjunction with one another to distill incoming crude oil into various fractions that are routed to other refinery processing units for further processing and output.

As the complexity of an industrial process facility increases, the ability monitor and control the various processes can become increasing difficult. In many instances, industrial process facilities employ process flow diagram (PFDs) (or "flowsheets") to monitor and control the various processes. A PFD typically provides a graphical display that illustrates operational relationships between process equipment. For example, a PFD for a hydrocarbon refinery CDU may include graphical representations of the pumps, the vessels, the heating/cooling systems and the piping systems of the CDU that diagrams the layout and operation of the CDU. As another example, a PFD for the hydrocarbon refinery may include a relatively large PFD that incorporates PFDs for the CDU and other refining processes.

SUMMARY

Although there are numerous techniques for providing process flow diagrams (PFDs) for industrial process facilities, many suffer from shortcomings that make them unreliable or impractical. For example, PFDs are often generated manually by way of a person iteratively selecting and placing graphics and specifications for process equipment into a PFD. This type of manual PFD creation process can be labor intensive and is generally prone to errors. Moreover, PFDs are normally created for a particular type of human-machine-interface (HMI) application, and, thus, may be limited to use with only a single type of HMI application. As a result, a version of a PFD may need to be manually generated for each HMI application that is it is to be deployed on. For example, if a PFD is created for a first HMI application used to monitor a process facility, and there is a second HMI application that is introduced into the facility, the PFD may need to be manually recreated for the second HMI application and any other types of HMI applications ultimately employed by the facility. This approach can be labor intensive and generally prone to errors and inconsistencies.

Provided are embodiments of improved techniques for generating and employing PFDs. In some embodiments, a PFD is dynamically generated for one or more HMI applications based on a dynamic process model. For example, in some embodiments, dynamic generation of a PFD for an industrial facility process includes the following: (a) generating a process structural model (e.g., generating a model that defines process equipment employed by the process and associated characteristics); (b) generating a PFD interface model (e.g., generating an interface model that defines graphical characteristics associated with the HMI for the types of process equipment employed by the process); (c) generating a grouped process structural model (e.g., generating a process structural model that groups related process equipment and connections there between and that defines associated graphical characteristics); (d) generating a routed process model (e.g., generating a process model that defines relative display locations for graphical representations of the process equipment employed by the process); and (e) presenting a PFD by way of the HMI application based on the routed process model (e.g., rendering, using the HMI application, a PFD that includes graphical representations of the process equipment employed by the process in locations defined by the routed process model).

In some embodiments, the PFD is dynamically updated in real-time based on operational data received for the associated process. For example, the process structural model (and the resulting grouped process structural model and the routed process model) may include definitions of sensors (and sensor images) associated with the pieces of process equipment employed by the process, operational data may be received from the sensors, and corresponding sensor images embedded within the displayed PFD may be updated to reflect the received operational data (e.g., a slide representing a level of fluid within a tank may be moved to reflect a current level reported by a fluid level sensor of the tank). In some embodiments, PFDs can be generated for multiple HMI application based on the process structural model and a corresponding interface model. For example, generating a corresponding PFD for display on a second HMI application may include generating a second interface model for the second HMI application, and repeating steps (c) and (d) using the process structural model and the second interface model to generate a PFD for the second HMI application, and presenting the PFD by way of the second HMI application. This may enable a single process structural model to be used in the generation of PFDs for different HMI applications. This can reduce the burden and errors associated with having to essentially recreate a PFD for each HMI application that is employed.

Provided in some embodiments is a method of monitoring an industrial process of an industrial process facility that includes: determining a process structural model that defines operational characteristics of pieces of equipment of an industrial process facility used to perform an industrial process, the process structural model including, for each piece of equipment to be represented in PFD for the industrial process: an equipment type definition that defines an equipment type of the piece of equipment; a source definition that defines, for each resource stream to be received for processing by the piece of equipment: one or more outlets of one or more pieces of equipment in the industrial process facility from which the resource stream is provided; and an inlet of the piece of equipment at which the resource stream is to be received for processing by the piece of equipment; a destination definition that defines, for each resource stream to be output by the piece of equipment: an outlet of the piece of equipment from which the resource stream is to be output; and one or more inlets of one or more pieces of equipment in the industrial process facility to which the resource stream is to be provided; and a sensor definition that defines any sensors adapted to sense characteristics of the processing by the piece of equipment and a corresponding sensor type for each of the any sensors; determining an interface application to display the PFD for the industrial process; obtaining, in response to determining the interface application to display the PFD for the industrial process, an interface model for the interface application, the interface model defining, for each equipment type of the process structural model, interface information that includes: an equipment image associated with the equipment type; and display characteristics for the equipment image associated with the equipment type; determining, based on the process structural model for the industrial process, a grouped process structural model for the industrial process, the determining of the grouped process structural model including: grouping, based on the process structural model for the industrial process, sensors with associated process equipment to determine a sensor-grouped process structural model for the industrial process; grouping, based on the sensor-grouped process structural model for the industrial process, process equipment to determine an equipment-grouped process structural model for the industrial process; grouping, based on the equipment-grouped process structural model for the industrial process, connections between pieces of equipment to determine an edge-grouped process structural model for the industrial process; and incorporating the interface model for the interface application with the edge-grouped process structural model for the industrial process to determine the grouped process structural model; determining, based on the grouped process structural model for the industrial process, a routed process model for the industrial process; and generating, based on the routed process model for the industrial process, the PFD for the industrial process.

In certain embodiments, the grouping of sensors with associated process equipment to determine the sensor-grouped process structural model for the industrial process includes: for each piece of equipment to be represented in the PFD for the industrial process: for each of any sensors identified in the sensor definition for the piece of equipment, associating sensor equipment information for the sensor as a sub-node of equipment information for the piece of process equipment. In some embodiments, the grouping of process equipment to determine the equipment-grouped process structural model for the industrial process includes: identifying pieces of process equipment having the same input and outputs; and generating a grouped node that includes the equipment information for the pieces of process equipment having the same inputs and outputs. In certain embodiments, grouping connections between pieces of equipment to determine an edge-grouped process structural model for the industrial process includes: for each inlet of a piece of equipment: determining whether the inlet is connected to two or more sources; and in response to determining that the inlet is connected to two or more sources: generating an inlet junction node for the inlet; generating, for each of the inlet connections between a source and the inlet, a source-junction connection that extends from the source to the inlet junction node; and generating a junction-inlet connection that extends from the inlet junction node to the inlet of the piece of equipment; and for each outlet of a piece of equipment: determining whether the outlet is connected to two or more destinations; and in response to determining that the outlet is connected to two or more destinations, generating an outlet junction node for the outlet; generating an outlet-junction connection that extends from the outlet of the piece of equipment to the outlet junction node; and generating, for each of the outlet connections between the outlet and a destination, a junction-destination connection that extends from the outlet junction node to the destination. In some embodiments, incorporating the interface model for the interface application with the edge-grouped process structural model for the industrial process to determine the grouped process structural model includes: for each set of equipment information of the edge-grouped process structural model: identifying an equipment type associated with the equipment information; identifying interface information of the interface model that is associated with the equipment type; and associating the interface information with the set of equipment information. In certain embodiments, determining the routed process model for the industrial process includes identification of display locations for images representing each piece of equipment to be represented in the PFD for the industrial process, and generating the PFD for the industrial process includes displaying the images representing each piece of equipment in accordance with the display locations identified by the routed process model. In some embodiments, generating the PFD for the industrial process includes: obtaining a first set of process parameters corresponding to conditions of the industrial process at a first point in time; displaying the images representing each piece of equipment in accordance with the display locations identified by the routed process model, where images associated with the sensors reflect the first set of process parameters; obtaining a second set of process parameters corresponding to conditions of the industrial process at a second point in time; and in response to obtaining a second set of process parameters corresponding to conditions of the industrial process at a second point in time, updating the display of the images associated with the sensors to reflect the second set of process parameters. In some embodiments, this process is repeated for more than two points in time. For example, the control system may regularly (e.g., every minute, second, etc.) obtain a set of parameters and generate corresponding updates. In certain embodiments, the method further includes: determining, based on the PFD for the industrial process, a process parameter for the industrial process; and controlling the industrial process to implement the process parameter.

Provided in some embodiments is a system for monitoring an industrial process of an industrial process facility that includes: a processor; and a non-transitory computer readable storage medium having program instructions stored thereon that are executable by the processor to perform the following operations for monitoring an industrial process of an industrial process facility: determining a process structural model that defines operational characteristics of pieces of equipment of an industrial process facility used to perform an industrial process, the process structural model including, for each piece of equipment to be represented in PFD for the industrial process: an equipment type definition that defines an equipment type of the piece of equipment; a source definition that defines, for each resource stream to be received for processing by the piece of equipment: one or more outlets of one or more pieces of equipment in the industrial process facility from which the resource stream is provided; and an inlet of the piece of equipment at which the resource stream is to be received for processing by the piece of equipment; a destination definition that defines, for each resource stream to be output by the piece of equipment: an outlet of the piece of equipment from which the resource stream is to be output; and one or more inlets of one or more pieces of equipment in the industrial process facility to which the resource stream is to be provided; and a sensor definition that defines any sensors adapted to sense characteristics of the processing by the piece of equipment and a corresponding sensor type for each of the any sensors; determining an interface application to display the PFD for the industrial process; obtaining, in response to determining the interface application to display the PFD for the industrial process, an interface model for the interface application, the interface model defining, for each equipment type of the process structural model, interface information that includes: an equipment image associated with the equipment type; and display characteristics for the equipment image associated with the equipment type; determining, based on the process structural model for the industrial process, a grouped process structural model for the industrial process, the determining of the grouped process structural model including: grouping, based on the process structural model for the industrial process, sensors with associated process equipment to determine a sensor-grouped process structural model for the industrial process; grouping, based on the sensor-grouped process structural model for the industrial process, process equipment to determine an equipment-grouped process structural model for the industrial process; grouping, based on the equipment-grouped process structural model for the industrial process, connections between pieces of equipment to determine an edge-grouped process structural model for the industrial process; and incorporating the interface model for the interface application with the edge-grouped process structural model for the industrial process to determine the grouped process structural model; determining, based on the grouped process structural model for the industrial process, a routed process model for the industrial process; and generating, based on the routed process model for the industrial process, the PFD for the industrial process.

In some embodiments, the grouping of sensors with associated process equipment to determine the sensor-grouped process structural model for the industrial process includes: for each piece of equipment to be represented in the PFD for the industrial process: for each of any sensors identified in the sensor definition for the piece of equipment, associating sensor equipment information for the sensor as a sub-node of equipment information for the piece of process equipment. In certain embodiments the grouping of process equipment to determine the equipment-grouped process structural model for the industrial process includes: identifying pieces of process equipment having the same input and outputs; and generating a grouped node that includes the equipment information for the pieces of process equipment having the same inputs and outputs. In some embodiments grouping connections between pieces of equipment to determine an edge-grouped process structural model for the industrial process includes: for each inlet of a piece of equipment: determining whether the inlet is connected to two or more sources; and in response to determining that the inlet is connected to two or more sources: generating an inlet junction node for the inlet; generating, for each of the inlet connections between a source and the inlet, a source-junction connection that extends from the source to the inlet junction node; and generating a junction-inlet connection that extends from the inlet junction node to the inlet of the piece of equipment; and for each outlet of a piece of equipment: determining whether the outlet is connected to two or more destinations; and in response to determining that the outlet is connected to two or more destinations, generating an outlet junction node for the outlet; generating an outlet-junction connection that extends from the outlet of the piece of equipment to the outlet junction node; and generating, for each of the outlet connections between the outlet and a destination, a junction-destination connection that extends from the outlet junction node to the destination. In certain embodiments incorporating the interface model for the interface application with the edge-grouped process structural model for the industrial process to determine the grouped process structural model includes: for each set of equipment information of the edge-grouped process structural model: identifying an equipment type associated with the equipment information; identifying interface information of the interface model that is associated with the equipment type; and associating the interface information with the set of equipment information. In some embodiments determining the routed process model for the industrial process includes identification of display locations for images representing each piece of equipment to be represented in the PFD for the industrial process, and generating the PFD for the industrial process includes displaying the images representing each piece of equipment in accordance with the display locations identified by the routed process model. In certain embodiments generating the PFD for the industrial process includes: obtaining a first set of process parameters corresponding to conditions of the industrial process at a first point in time; displaying the images representing each piece of equipment in accordance with the display locations identified by the routed process model, where images associated with the sensors reflect the first set of process parameters; obtaining a second set of process parameters corresponding to conditions of the industrial process at a second point in time; and in response to obtaining a second set of process parameters corresponding to conditions of the industrial process at a second point in time, updating the display of the images associated with the sensors to reflect the second set of process parameters. In some embodiments, this process is repeated for more than two points in time. For example, the control system may regularly (e.g., every minute, second, etc.) obtain a set of parameters and generate corresponding updates. In certain embodiments the operations further include: determining, based on the PFD for the industrial process, a process parameter for the industrial process; and controlling the industrial process to implement the process parameter.

Provided in some embodiments is non-transitory computer readable storage medium including program instructions stored thereon that are executable by a processor to perform the following operations for monitoring an industrial process of an industrial process facility: determining a process structural model that defines operational characteristics of pieces of equipment of an industrial process facility used to perform an industrial process, the process structural model including, for each piece of equipment to be represented in PFD for the industrial process: an equipment type definition that defines an equipment type of the piece of equipment; a source definition that defines, for each resource stream to be received for processing by the piece of equipment: one or more outlets of one or more pieces of equipment in the industrial process facility from which the resource stream is provided; and an inlet of the piece of equipment at which the resource stream is to be received for processing by the piece of equipment; a destination definition that defines, for each resource stream to be output by the piece of equipment: an outlet of the piece of equipment from which the resource stream is to be output; and one or more inlets of one or more pieces of equipment in the industrial process facility to which the resource stream is to be provided; and a sensor definition that defines any sensors adapted to sense characteristics of the processing by the piece of equipment and a corresponding sensor type for each of the any sensors; determining an interface application to display the PFD for the industrial process; obtaining, in response to determining the interface application to display the PFD for the industrial process, an interface model for the interface application, the interface model defining, for each equipment type of the process structural model, interface information that includes: an equipment image associated with the equipment type; and display characteristics for the equipment image associated with the equipment type; determining, based on the process structural model for the industrial process, a grouped process structural model for the industrial process, the determining of the grouped process structural model including: grouping, based on the process structural model for the industrial process, sensors with associated process equipment to determine a sensor-grouped process structural model for the industrial process; grouping, based on the sensor-grouped process structural model for the industrial process, process equipment to determine an equipment-grouped process structural model for the industrial process; grouping, based on the equipment-grouped process structural model for the industrial process, connections between pieces of equipment to determine an edge-grouped process structural model for the industrial process; and incorporating the interface model for the interface application with the edge-grouped process structural model for the industrial process to determine the grouped process structural model; determining, based on the grouped process structural model for the industrial process, a routed process model for the industrial process; and generating, based on the routed process model for the industrial process, the PFD for the industrial process.

In some embodiments the grouping of sensors with associated process equipment to determine the sensor-grouped process structural model for the industrial process includes: for each piece of equipment to be represented in the PFD for the industrial process: for each of any sensors identified in the sensor definition for the piece of equipment, associating sensor equipment information for the sensor as a sub-node of equipment information for the piece of process equipment. In certain embodiments the grouping of process equipment to determine the equipment-grouped process structural model for the industrial process includes: identifying pieces of process equipment having the same input and outputs; and generating a grouped node that includes the equipment information for the pieces of process equipment having the same inputs and outputs. In some embodiments grouping connections between pieces of equipment to determine an edge-grouped process structural model for the industrial process includes: for each inlet of a piece of equipment: determining whether the inlet is connected to two or more sources; and in response to determining that the inlet is connected to two or more sources: generating an inlet junction node for the inlet; generating, for each of the inlet connections between a source and the inlet, a source-junction connection that extends from the source to the inlet junction node; and generating a junction-inlet connection that extends from the inlet junction node to the inlet of the piece of equipment; and for each outlet of a piece of equipment: determining whether the outlet is connected to two or more destinations; and in response to determining that the outlet is connected to two or more destinations, generating an outlet junction node for the outlet; generating an outlet-junction connection that extends from the outlet of the piece of equipment to the outlet junction node; and generating, for each of the outlet connections between the outlet and a destination, a junction-destination connection that extends from the outlet junction node to the destination. In certain embodiments incorporating the interface model for the interface application with the edge-grouped process structural model for the industrial process to determine the grouped process structural model includes: for each set of equipment information of the edge-grouped process structural model: identifying an equipment type associated with the equipment information; identifying interface information of the interface model that is associated with the equipment type; and associating the interface information with the set of equipment information. In some embodiments, determining the routed process model for the industrial process includes identification of display locations for images representing each piece of equipment to be represented in the PFD for the industrial process, and generating the PFD for the industrial process includes displaying the images representing each piece of equipment in accordance with the display locations identified by the routed process model. In certain embodiments generating the PFD for the industrial process includes: obtaining a first set of process parameters corresponding to conditions of the industrial process at a first point in time; displaying the images representing each piece of equipment in accordance with the display locations identified by the routed process model, where images associated with the sensors reflect the first set of process parameters; obtaining a second set of process parameters corresponding to conditions of the industrial process at a second point in time; and in response to obtaining a second set of process parameters corresponding to conditions of the industrial process at a second point in time, updating the display of the images associated with the sensors to reflect the second set of process parameters. In some embodiments, this process is repeated for more than two points in time. For example, the control system may regularly (e.g., every minute, second, etc.) obtain a set of parameters and generate corresponding updates. In some embodiments, the operations further include determining, based on the PFD for the industrial process, a process parameter for the industrial process; and controlling the industrial process to implement the process parameter.

BRIEF DESCRIPTION OF THE DRAWINGS

FIG. 4A is a diagram that illustrates an industrial process structural model in accordance with one or more embodiments.

FIG. 4B is a diagram that illustrates an industrial process interface model in accordance with one or more embodiments.

FIG. 7A is a diagram that illustrates a sensor-grouped process structural model in accordance with one or more embodiments.

FIG. 7B is a diagram that illustrates an equipment-grouped process structural model in accordance with one or more embodiments.

FIG. 7C is a diagram that illustrates an edge-grouped process structural model in accordance with one or more embodiments.

FIGS. 7D and 7E are diagrams that illustrate a grouped process structural model and a routed process model, respectively, in accordance with one or more embodiments.

Figure 1:
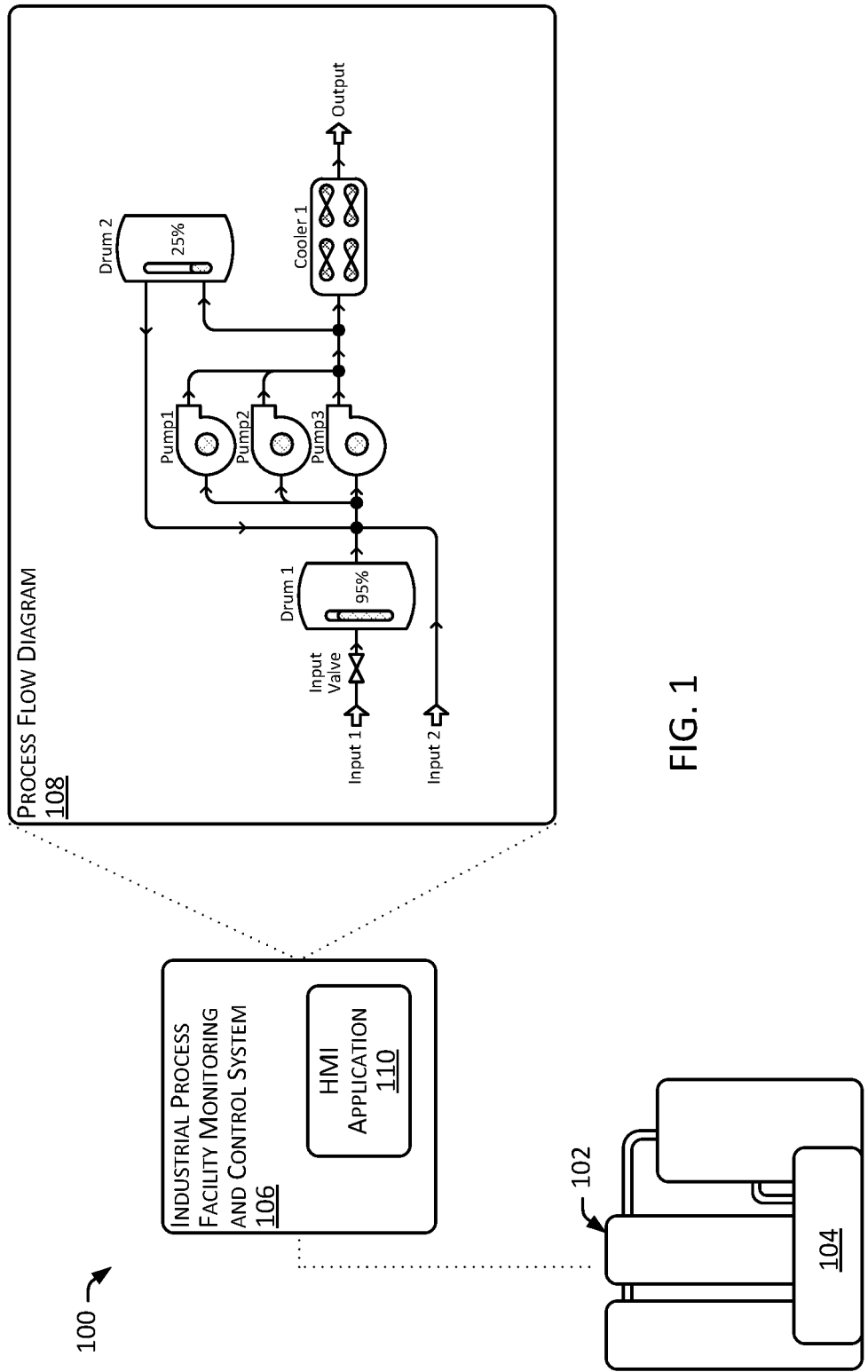
FIG. 1 is a diagram that illustrates an industrial process facility environment in accordance with one or more embodiments.

While this disclosure is susceptible to various modifications and alternative forms, specific embodiments are shown by way of example in the drawings and are described in detail. The drawings may not be to scale. It should be understood that the drawings and the detailed descriptions are not intended to limit the disclosure to the particular form disclosed, but are intended to disclose modifications, equivalents, and alternatives falling within the scope of the present disclosure as defined by the claims.

DETAILED DESCRIPTION

Described are embodiments of novel systems and methods for generating and employing process flow diagrams (PFDs) for industrial processes. In some embodiments, a PFD is dynamically generated for one or more HMI applications based on a dynamic process model. For example, in some embodiments, dynamic generation of a PFD for an industrial facility process includes the following: (a) generating a process structural model (e.g., generating a model that defines process equipment employed by the process and associated characteristics); (b) generating a PFD interface model (e.g., generating an interface model that defines graphical characteristics associated with the HMI for the types of process equipment employed by the process); (c) generating a grouped process structural model (e.g., generating a process structural model that groups related process equipment and connections there between and that defines associated graphical characteristics); (d) generating a routed process model (e.g., generating a process model that defines relative display locations for graphical representations of the process equipment employed by the process); and (e) presenting a PFD by way of the HMI application based on the routed process model (e.g., rendering, using the HMI application, a PFD that includes graphical representations of the process equipment employed by the process in locations defined by the routed process model).

In some embodiments, the PFD is dynamically updated in real-time based on operational data received for the associated process. For example, the process structural model (and the resulting grouped process structural model and the routed process model) may include definitions of sensors (and sensor images) associated with the pieces of process equipment employed by the process, operational data may be received from the sensors, and corresponding sensor images embedded within the displayed PFD may be updated to reflect the received operational data (e.g., a slide representing a level of fluid within a tank may be moved to reflect a current level reported by a fluid level sensor of the tank). In some embodiments, PFDs can be generated for multiple HMI application based on the process structural model and a corresponding interface model. For example, generating a corresponding PFD for display on a second HMI application may include generating a second interface model for the second HMI application, and repeating steps (c) and (d) using the process structural model and the second interface model to generate a PFD for the second HMI application, and presenting the PFD by way of the second HMI application. This may enable a single process structural model to be used in the generation of PFDs for different HMI applications. This can reduce the burden and errors associated with having to essentially recreate a PFD for each HMI application that is employed.

FIG. 1 is a diagram that illustrates an industrial process environment ("environment") 100 in accordance with one or more embodiments. In the illustrated embodiment, the environment 100 includes an industrial process facility ("facility" or "plant") 102 that includes industrial process equipment ("equipment") 104 and an industrial process facility monitoring and control system ("control system") 106 that employs one or more human-machine-interface application 110 for display of process flow diagrams (PFDs) 108.

In some embodiments, the industrial process facility ("facility" or "plant") 102 is an industrial facility that employs chemical, physical, electrical or mechanical process steps for manufacturing items. For example, the facility 102 may be a chemical plant, a petrochemical plant, or a hydrocarbon refinery (or "oil refinery"). The facility 102 may employ multiple industrial processes operating in conjunction with one another to generate a desired output. For example, in the case of the facility 102 being a hydrocarbon refinery, the facility 102 may have distillation, cracking, treatment and other processes running simultaneously (e.g., in series or parallel) to convert crude oil into gasoline and other products.

In some embodiments, the industrial process equipment ("equipment") 104 includes equipment that is employed to complete the various industrial processes of the facility 102. For example, in the case of the facility 102 being a hydrocarbon refinery having a crude oil distillation unit (CDU), the equipment 104 may include pumps, valves, vessels, heating/cooling systems, piping and other types/pieces of industrial process equipment working in conjunction with one another to distill incoming crude oil into various fractions that are routed to other refinery processing units for further processing and output. Process equipment may include, for example, pumps, valves, vessels, filters, coolers, heat exchangers, pulsation dampeners, sensors, piping, or the like.

In some embodiments, the industrial process facility monitoring and control system ("control system") 106 is a system that provides for monitoring and controlling various processes within the facility 102. For example, in the case of the facility 102 being a hydrocarbon refinery having a CDU, the control system 106 may include a SCADA computer system that monitors and controls operation of the pumps, valves, vessels, heating/cooling systems, and other equipment of the CDU. With regard to a valve, the control system 106 may, for example, receive, from a valve sensor, data regarding the state of the valve, display a PFD 108 that indicates a status of the valve, and be operable to control the state of the valve. With regard to a vessel, such as a tank, the control system 106 may, for example, be operable to receive, from a vessel sensor, data regarding a level of fluid in the vessel, display a PFD 108 that indicates the level of fluid in the tank, and be operable to control pieces of equipment 104 to fill or drain the tank. With regard to a pump, the control system 106 may, for example, be operable to receive, from a pump sensor, data regarding a flowrate of fluid through the pump, display a PFD that indicates the status/flow of the pump, and be operable to control operation of the pump. With regard to a heating/cooling system, such as a heat exchanger (or "cooler"), the control system 106 may, for example, be operable to receive, from a heating/cooling system sensor, data regarding the flowrate and temperature of fluid flowing through the pump, present a PFD that indicates the flowrate or temperature, and control operation of the heating/cooling system. In some embodiments, the control system 106 includes a computer system that is the same or similar to the computer system 1000 described with regard to at least FIG. 10.

In some embodiment, the control system 106 includes a supervisory control and data acquisition (SCADA) system. For example, the control system 106 may include one or more networked computers that are operable to obtain, assess and present information regarding operations of the processes of the facility 102, and that are operable to control the various processes within the facility 102. The data may be obtained, for example, by a supervisory computer by way of one or more sensors (e.g., by way of remote terminal units (RTUs), one or more programmable logic controllers (PLCs) or other intermediary supervisory devices). The data may be processed, for example, by the supervisory computer system. Corresponding information (e.g., a PFD) may, for example, be presented by way of a graphical display of a human-machine interface (HMI) application 110 of the supervisory computer system. The supervisory computer system may, for example, be operable issue commands to control operation process equipment 104 (e.g., by way of one or more RTUs, one or more PLCs or other intermediary supervisory devices).

In some embodiments, the control system 106 is operable to present a PFD 108 for one or more industrial processes within the facility 102. For example, in the case of the facility 102 being a hydrocarbon refinery having a CDU, the control system 106 may obtain a PFD 108 for the crude oil distillation process performed by the CDU and render the PFD 108 using a human-machine interface (HIM) application 110 to generate a graphical display of the PFD 108 for viewing by personnel at the facility 102. For example, FIG. 1 illustrates a graphical presentation of a PFD 108 for a process that employs two inputs, an input valve, two vertical tanks (or "drums"), three pumps, a cooler and an output.

In some embodiments, a PFD 108 is dynamically generated for use with one or more HMI applications 110 based on a dynamic process model. For example, in some embodiments, dynamic generation of a PFD 108 for a process of the facility 102 includes the following: (a) generating a process structural model (e.g., generating a model that defines process equipment 104 employed by the process and associated characteristics); (b) generating an interface model (e.g., generating a model that defines graphical characteristics associated with an HMI application 110 for the types of process equipment 104 employed by the process); (c) generating a grouped process structural model (e.g., generating a process structural model that groups related process equipment 104 and connections there between, and that defines associated graphical characteristics); (d) generating a routed process model (e.g., generating a model that defines relative display locations for graphical representations of the process equipment 104 employed by the process); and (e) presenting a PFD 108 by way of the HMI application 110 based on the routed process model (e.g., rendering, using the HMI application 110, the PFD 108 that includes graphical representations of the process equipment 104 employed by the process in locations defined by the routed process model).

In some embodiments, the PFD 108 is dynamically updated in real-time based on operational data received for the industrial facility process. For example, the process structural model (and the resulting grouped process structural model and the routed process model) may include definitions of sensors (and sensor images) associated with pieces of the process equipment 104 employed by the process, operational data may be received from the sensors, and corresponding sensor images embedded within the displayed PFD 108 may be updated to reflect the received operational data (e.g., a slide representing a level of fluid within a tank may be moved to reflect a current level reported by a fluid level sensor of the tank). In some embodiments, a PFD 108 can be generated for multiple HMI applications 110 based on the process structural model and a corresponding interface model for the HMI application 110. For example, generating a corresponding PFD 108 for display by way of a second HMI application 110 may include generating a second interface model for the second HMI application 110, and repeating steps (c) and (d) using the process structural model and the second interface model to generate a second PFD 108 for the second HMI application 110, and presenting the second PFD 108 by way of the second HMI application 110.

Figure 2:
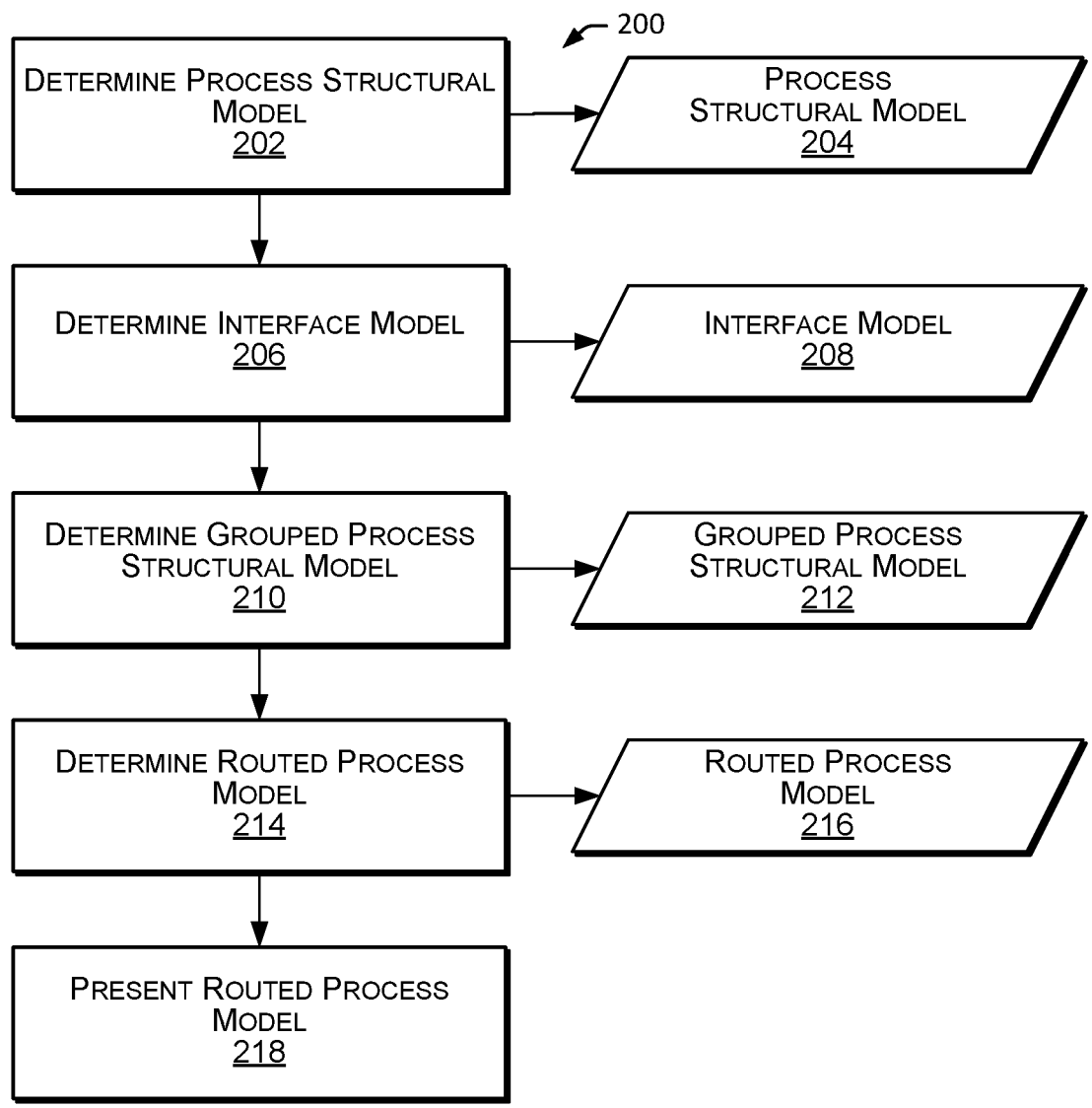
FIG. 2 is a flowchart that illustrates a method of operating an industrial process facility environment in accordance with one or more embodiments.

FIG. 2 is a flowchart that illustrates a method of operating an industrial process facility in accordance with one or more embodiments. In the context of the facility 102, the operations of method 200 may be performed, for example, by the control system 106 or another operator of the facility 102. A processing module of the control system 106 may, for example, perform one or more of the data processing operations described, such as those directed to dynamically generating and presenting a PFD 108, collecting and processing equipment sensor data, or updating the PFD 108 based on the collected data. A facility operator, such as a control module of the control system 106 or facility personnel, may control processes of the facility based on the collected data or the PFD 108. For example, a control module of the control system 106 (or facility personnel) may determine process operating parameters based on the collected/processed equipment sensor data or the displayed PFD 108, and the control module of the control system 106 (or facility personnel) may control process equipment to operate in accordance with the process operating parameters.

In some embodiments, method 200 includes determining a process structural model 204 (block 202). This may include generating (or otherwise obtaining) a process structural model that defines operational characteristics of pieces of equipment of an industrial process facility used to perform an industrial process. For example, determining a process structural model 204 for the facility 102 may include the control system 106 generating (or otherwise obtaining) a process structural model 204 that defines operational characteristics of pieces of equipment 104 of the facility 102 that are used to perform an industrial process (e.g., process 300 of FIG. 3) within the facility 104.

A process structural model for an industrial process may include, for example, the following "equipment" information for each of the pieces of equipment to be represented in a PFD for the industrial process:
  (a) an equipment description that includes the following:
    (i) a unique identifier for the piece of equipment (e.g., a unique name from the other pieces of equipment in the process or the facility);
    (ii) a description of the piece of equipment (e.g., a colloquial textual description of the piece of equipment, such as the type, function, or location of the piece of equipment);
  (b) an equipment type definition that defines an equipment type of the piece of equipment (e.g., pump, valve, vessel, filter, cooler, heat exchanger, pulsation dampener, sensor, or piping);
  (c) a source definition that defines the following for each incoming resource stream to be received for processing by the piece of equipment:
    (i) a "source" outlet (e.g., defining one or more outlets of one or more pieces of equipment in the industrial process facility from which the incoming resource stream is provided); and
    (ii) a "source" inlet (e.g., defining one or more inlets of the piece of equipment at which the incoming resource stream is to be received for processing by the piece of equipment);
  (d) a destination definition that defines the following for each outgoing resource stream to be output by the piece of equipment:
    (ii) a "destination" outlet (e.g., defining one or more outlets of the piece of equipment from which the outgoing resource stream is to be output); and
    (ii) a "destination" inlet (e.g., defining one or more inlets of one or more pieces of equipment in the industrial process facility to which the outgoing resource stream is to be provided); and
  (e) a sensor definition that defines the following:
    (ii) sensor type equipment associated with the piece of equipment (e.g., any sensors operable to sense characteristics of the processing by the piece of equipment); and The process structural model may also include, for example, for each of any sensor type equipment associated with the pieces of equipment to be represented in the PFD for the industrial process, the following sensor equipment information:
  (a) a sensor type (e.g., flow sensor, level sensor, or on/off sensor);
  (b) units of measurement (e.g., gallons per minute (GPM), percent (%), or true/false); and
  (c) a sensor data identifier for the measurements sensed by the sensor (e.g., a SCADA tag that identifies the measurement provided to the control system).

Figure 3:
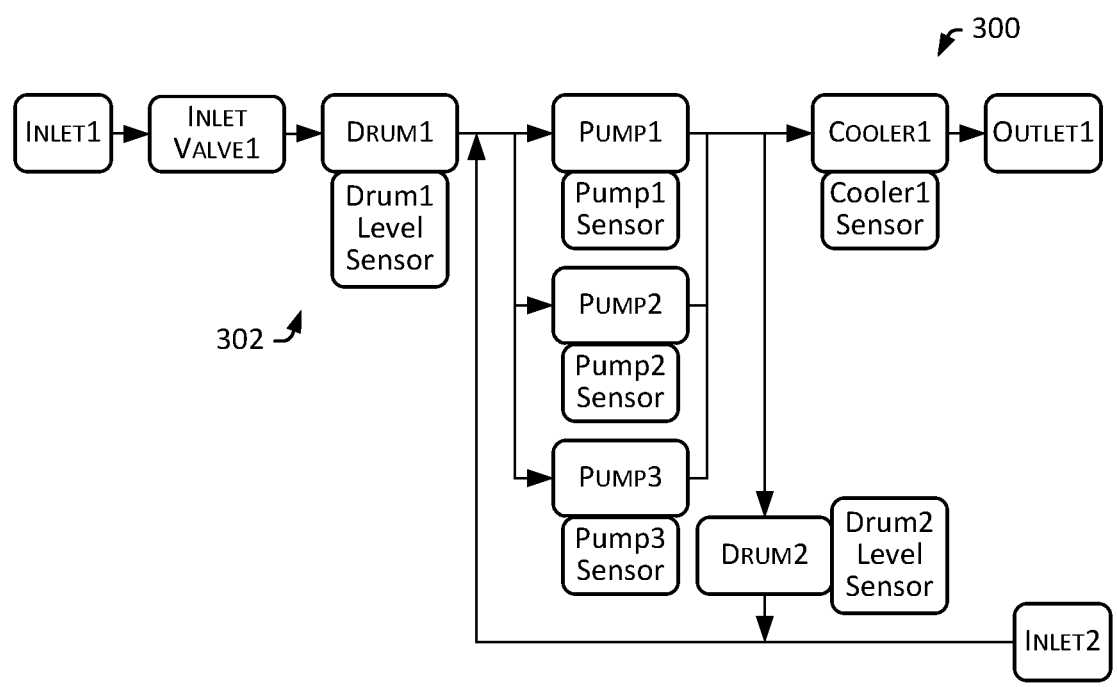
FIG. 3 is a block diagram that illustrates components of an industrial process in accordance with one or more embodiments.

FIG. 3 is a block diagram that illustrates components 302 of an example industrial process 300 in accordance with one or more embodiments. In the illustrated embodiment, the process employs the following process equipment: two inputs (e.g., "Inlet1" and "Inlet2"), a valve (e.g., "InletValve1"), two vertically oriented tank type vessels (e.g., "Drum1" and "Drum2"), three fluid pumps (e.g., "Pump1", "Pump2" and "Pump3"), a cooler type heat exchanger (e.g., "Cooler1") and an output (e.g., "Outlet1"), a fluid level sensor for each of the two vertically oriented tank type vessels (e.g., "Drum1LevelSensor" and "Drum2LevelSensor"), an operational type sensor for each of the pumps and the cooler (e.g., "Pump1Sensor," "Pump2Sensor," "Pump3Sensor," and "Cooler1Sensor").

FIG. 4A is a diagram that illustrates an industrial process structural model 204 for the example industrial process 300 in accordance with one or more embodiments. The industrial process structural model 204 defines, for each of the non-sensor type pieces equipment (e.g., for each of the inputs, the vertically oriented tank type vessels, the three fluid pumps, the cooler type heat exchanger and the output) equipment information that includes an equipment description, an equipment type definition, a source definition, a destination definition, and a sensor definition. For example, for the first vertically oriented tank type vessel, the industrial process structural model 204 defines equipment information that includes an equipment description (e.g., "Drum1" and "Drum1"), an equipment type definition (e.g., "Vertical Tank"), a source definition (e.g., "InletValve"), a destination definition (e.g., "Pump1, Pump2, Pump3"), and a sensor definition (e.g., "Drum1LevelSensor"). The industrial process structural model 204 defines for each of the sensor type pieces of equipment (e.g., for each of the fluid level type sensors, and the operational type sensors) equipment information that includes a sensor type, units of measurement, and a measurement identifier (or "tag") for the information sensed by the sensor. For example, for the first pump sensor (e.g., "Pump1Sensor"), the industrial process structural model 204 defines equipment information that includes a sensor type (e.g., "Sensor—Flow"), units of measurement (e.g. True/False), and a sensor data identifier for the measurements sensed by the sensor (e.g., SCADA_A #3458). Similar information is provided for each of the other pieces of equipment defined in the process structural model 204. In some embodiments, the process structural model 204 defined by a facility operator. Continuing with the prior example, personnel of the facility 102 may, for example, enter the relevant equipment information for each of the pieces of equipment 104 associated with the industrial process 300 into a document that defines the industrial process structural model 204.

In some embodiments, method 200 includes determining an interface model 208 (block 206). This may include (a) determining an interface application that will be used to render the display a PFD for the industrial process, and (b) determining, in response to the interface application determined, an interface model 208 that corresponds to the interface application. Continuing with the prior example, the interface application may include a given HMI application 110 that will be employed by the control system 106 to render a resulting PFD 108.

An interface model for an HMI application may include, for example, the following "interface" information for each of the different equipment types to be represented in a PFD for an industrial process:
  (a) an equipment image associated with the equipment type (e.g., "Inlet.png"); and
  (b) display characteristics that include, for example, the following:
    (i) fixed display characteristics (e.g., image location, and image size);

(ii) routing constraints (e.g., port location constraints); and (iii) dynamic display characteristics (e.g., conditional green/red coloring).

FIG. 4B is a diagram that illustrates an interface model 208 for display of a PFD 108 for the example industrial process 300 in accordance with one or more embodiments. The illustrated interface model 208 defines, for each of the different equipment types to be represented in the PFD 108 for the industrial process 300 (e.g., for each of "Inlet," "Outlet," "Valve," "Vertical Tank," "Pump," "Cooler," "Sensor—Level," "Sensor—Flow," "Sensor—Airflow," and "Junction") display parameters that includes the following: (a) an equipment image associated with the equipment type; (b) fixed display characteristics; (c) routing constraints; and (d) dynamic display characteristics. In some embodiments, the interface model 208 is defined by a facility operator. Continuing with the prior example, personnel of the facility 102 may, for example, enter the relevant display parameters for each of the different equipment types into a document that defines the interface model 208.

Figure 5:
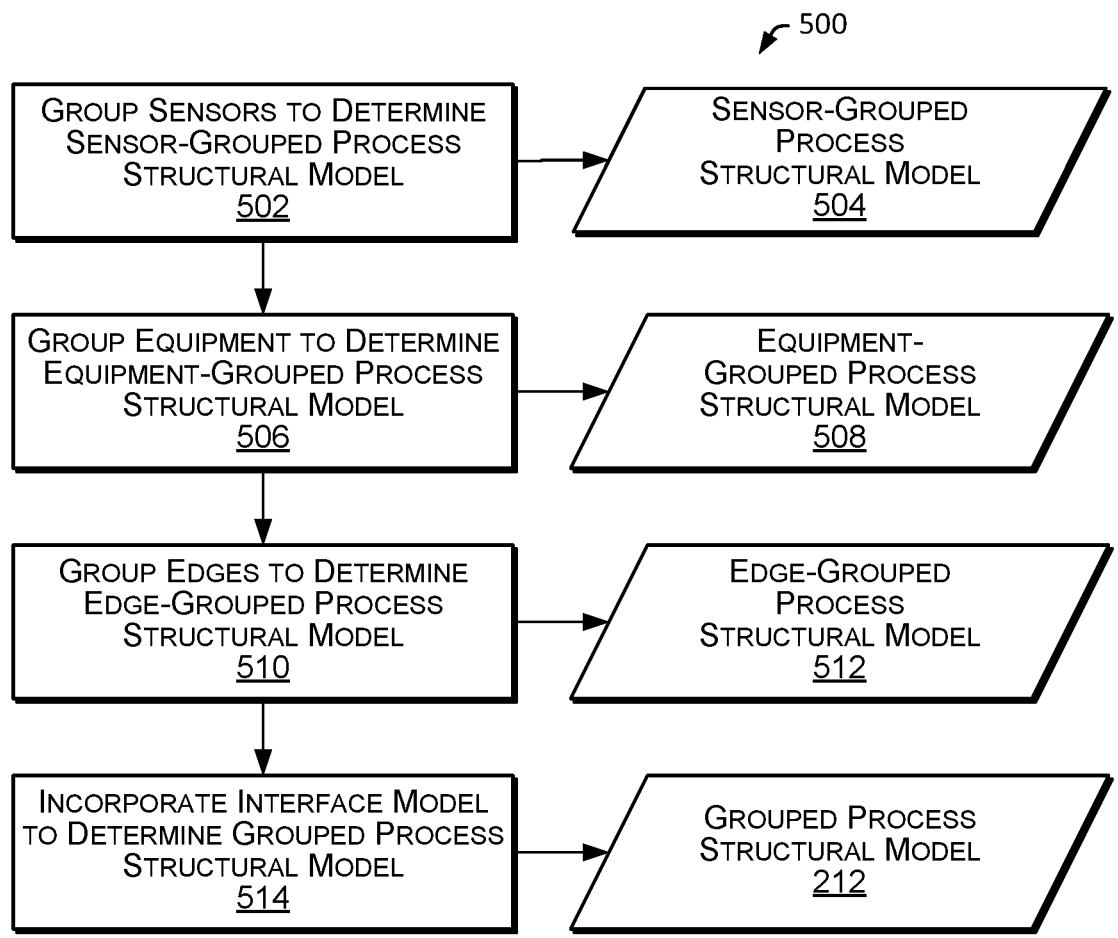
FIG. 5 is a flowchart that illustrates a method of determining a grouped process structural model in accordance with one or more embodiments.

In some embodiments, method 200 includes determining a grouped process structural model 212 (block 210). This may include determining, based on a process structural model 204 for an industrial process, a grouped process structural model 212 that includes groupings of sensors with corresponding pieces of process equipment, groupings of equipment having the same or similar inputs and outputs, and groupings of routings (or "edges" or "connections") between inputs and outputs of the process equipment. FIG. 5 is a flowchart that illustrates a method 500 of determining a grouped process structural model 212 in accordance with one or more embodiments. In the context of the facility 102, the operations of method 500 may be performed, for example, by the control system 106 or another operator of the facility 102.

In some embodiments, method 500 includes grouping sensors with associated process equipment to determine a sensor-grouped process structural model 504 (block 502). This may include for each piece of process equipment, generating "node" corresponding to the piece of equipment, and for each of any sensor-type piece of process equipment identified in the sensor definition for the piece of process equipment, associating the sensor-type equipment as "sub-node" of the piece of process equipment. The node may be defined by (or otherwise associated with) the characteristics of the piece of process equipment. The sub-node may be defined by (or otherwise associated with) the characteristics of the sensor. This may result in generation of a sensor-grouped process structural model 504 that "groups" sensor type equipment as subcomponents of associated pieces process equipment.

Figure 6A:
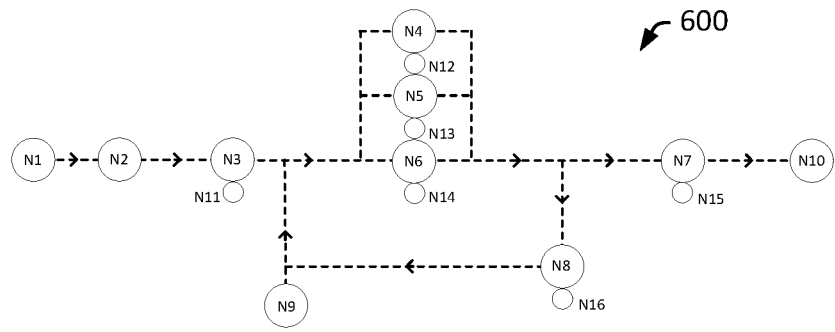
FIGS. 6A-6D are mappings that illustrate generation of a grouped process structural model in accordance with one or more embodiments.
Figure 6B:
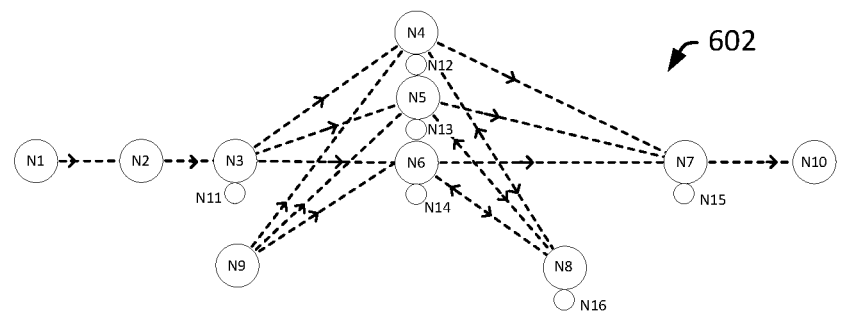

FIG. 6A is a "sensor-grouped" process mapping 600 that provides a visual illustration of the elements of a sensor-grouped process structural model 504 for the components of the industrial process 300 of FIG. 3 and the corresponding process structural model 204 of FIG. 4A in accordance with one or more embodiments. The nodes (N1-N16) of the process mapping 600 represent various types of process equipment (including sensors) and the dashed lines represent the connections between the nodes. FIG. 6B is "sensor-grouped" graph type process mapping 602 that provides a further visual illustration of the elements of a sensor-grouped process structural model 502 for the components of the industrial process 300 of FIG. 3 and the corresponding process structural model 204 of FIG. 4A in accordance with one or more embodiments. The nodes (N1-N16) of the mapping 602 represent various types of process equipment (including sensors) and each of the dashed lines represents a respective edge that represents a connection between two respective nodes. Referring to FIGS. 6A and 6B, the mappings 600 and 602 each include nodes (N1-N10) corresponding to Inlet1 (N1), InletValve1 (N2), Drum1 (N3), Pump1 (N4), Pump2 (N5), Pump3 (N6), Cooler1 (N7), Drum2 (N8), Inlet2 (N9), and Outlet1 (N10), with sub-nodes (N11-16) corresponding to Drum1LevelSensor (N11), Pump1Sensor (N12), Pump2Sensor (N13), Pump3Sensor (N14), Cooler1 Sensor (N15), and Drum2LevelSensor (N15).

FIG. 7A is a diagram that illustrates a corresponding sensor-grouped process structural model 504 for the components of the industrial process 300 of FIG. 3 and the corresponding process structural model 204 of FIG. 4A in accordance with one or more embodiments. Consistent with the illustration of FIGS. 6A and 6B, the sensor-grouped process structural model 504 of FIG. 7A includes a listing of process equipment in which each sensor-type piece of equipment defined in a sensors definition for a respective piece of process equipment is listed as a sub-component (or "sub-node") of the piece of process equipment. For example, Drum1LevelSens (and its associated equipment information) is listed as a sub-component (or "sub-node") of Drum1 (e.g., as indicated by the information being listed/indented immediately under the sensor definition of "Drum1LevelSens" for the Drum1 piece of process equipment). Grouping sensors with associated process equipment to determine a sensor-grouped process structural model 504 may include, for example, the control system 106 (or another operator of the facility 102) generating the sensor-grouped process structural model 504 of FIG. 7A (or the sensor-grouped process mapping 602 of FIG. 6B) based on the process structural model 204 of FIG. 4A (or the process mapping 600 of FIG. 6A) that defines components 302 of the industrial process 300 of FIG. 3.

In some embodiments, method 500 includes grouping process equipment to determine an equipment-grouped process structural model 508 (block 506). This may include identifying any pieces of process equipment that have the same inputs and outputs, and grouping those pieces of equipment into a single "grouped" node. The grouped node may be defined by (or otherwise associated with) the characteristics of the pieces of process equipment that make up the grouping. This may result in generation of an equipment-grouped process structural model 508 that "groups" process equipment having common inputs and outputs.

Figure 6C:
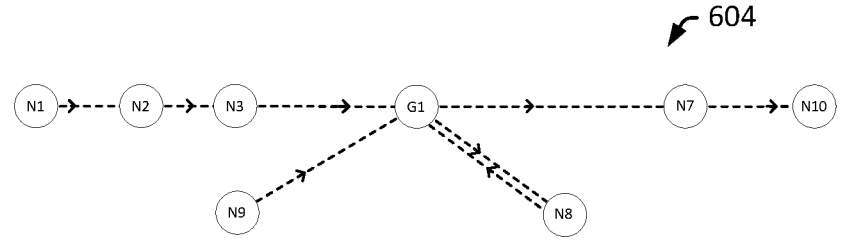

FIG. 6C is an "equipment-grouped" process mapping 604 that provides a visual illustration of the elements of an equipment-grouped process structural model 508 for the components of the industrial process 300 of FIG. 3 and the corresponding process structural model 204 of FIG. 4A in accordance with one or more embodiments. As illustrated, the nodes for the pumps (N4, N5 and N6) of the process mappings 600 (or 602), which each have common inputs (e.g., an input from Drum1 (N3), an input from Drum2 (N8) and an input from Inlet2 (N9)) and common outlets (e.g., an outlet to Cooler1 (N7) and an outlet to Drum2 (N8) (as well as the associated sensors), may be grouped into a single grouped node (G1).

FIG. 7B is a diagram that illustrates a corresponding equipment-grouped process structural model 508 for the components of the industrial process 300 of FIG. 3 and the corresponding process structural model 204 of FIG. 4A in accordance with one or more embodiments. Consistent with the illustration of FIG. 6C, the equipment-grouped process structural model 508 of FIG. 7B includes a listing with a process equipment group titled "Pump1,Pump2,Pump3 Group" that defines the pumps (N4, N5 and N6) (and associated sensors) as sub-components of the group. For example, the information for Pump1, Pump2, and Pump3 (and their associated sensors) are each listed as a sub-component (or "sub-node") of the Pump1,Pump2,Pump3 Group (e.g., as indicated by their information being listed/indented under the group name "Pump1,Pump2,Pump3 Group"). Grouping process equipment to determine an equipment-grouped process structural model 508 may include, for example, the control system 106 (or another operator of the facility 102) generating the equipment-grouped process structural model 508 of FIG. 7B (or the equipment-grouped process mapping 604 of FIG. 6C) based on the sensor-grouped process structural model 504 of FIG. 7A (or the sensor-grouped process mapping 602 of FIG. 6B) that defines the sensor-grouped components of the industrial process 300 of FIG. 3.

In some embodiments, method 500 includes grouping connections between pieces of equipment (or "edges") to determine an edge-grouped process structural model 512 (block 510). This may include the following: (I) for each inlet of a piece of equipment: (1) determining whether the inlet is connected to two or more sources (e.g., determining whether the inlet is connected to two or more outlets of other pieces of process equipment); and (2) in response to determining that the inlet is connected to two or more sources: (a) generating an "inlet" junction node for the inlet; and (b) generating, in place of the two or more "inlet" connections: (i) for each of the inlet connections between a source and the inlet, a "source-junction" connection that extends from the source (e.g., from an outlet of another piece of process equipment) to the inlet junction node, and (ii) a "junction-inlet" connection that extends from the inlet junction node to the inlet of the piece of equipment; and (II) for each outlet of a piece of equipment: (1) determining whether the outlet is connected to two or more destinations (e.g., determining whether the outlet is connected to two or more inlets of other pieces of process equipment); and (2) in response to determining that the outlet is connected to two or more destinations: (a) generating an "outlet" junction node for the outlet; and (b) generating, in place of the two or more "outlet" connections: (i) an "outlet-junction" connection that extends from the outlet of the piece of equipment to the outlet junction node; and (ii) for each of the outlet connections between the outlet and a destination; a "junction-destination" connection that extends from the outlet junction node to the destination (e.g., to an inlet of another piece of process equipment). With reference to a graph mapping of nodes and edges, this may include the following: (I) for each inlet of a node representing a piece of equipment: (1) determining whether the inlet is connected to two or more edges of the graph; and (2) in response to determining that the inlet is connected to two or more edges of the graph: (a) generating an "inlet" junction node for the inlet; and (b) generating, in place of the two or more edges: (i) for each outlet of the two or more edges, a "source-junction" edge that extends from the outlet to the inlet junction node; and (ii) a "junction-inlet" edge that extends from the inlet junction node to the inlet; and (II) for each outlet of a node representing a piece of equipment: (1) determining whether the outlet is connected to two or more edges of the graph; (2) in response to determining that the outlet is connected to two or more edges of the graph: (a) generating an "outlet" junction node for the outlet; and (b) generating, in place of the two or more edges: (i) an "outlet-junction" edge that extends from the outlet to the outlet junction node; and (ii) for each inlet of the two or more edges, a "junction-destination" edge that extends from the outlet junction node to the inlet.

Figure 6D:
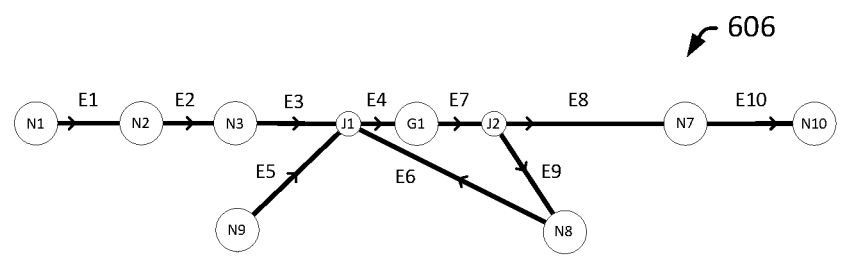

FIG. 6D is an "edge-grouped" process mapping 606 that provides a visual illustration of the elements of an edge-grouped process structural model 512 for the components of the industrial process 300 of FIG. 3 and the corresponding process structural model 204 of FIG. 4A in accordance with one or more embodiments. As illustrated, individual edges are created for inlet/outlet connections that do not have two or more sources or destinations (see, e.g., edges E1, E2 and E10), and inlet/outlet junction nodes and corresponding edges are created for inlet/outlet connections that have two or more sources/destinations (see, e.g., junction nodes J1 and J2, and edges E3-E9). For example, based on an inlet of grouped node G1 having input from multiple nodes (N3, N8 and N9), an "inlet" junction (J1) is created, "source-junction" edges (E3, E5 and E6) are created, and a "junction-inlet" edge (E4) is created. As a further example, based on an outlet of grouped node G1 having an output to multiple nodes (N7 and N8), an "outlet" junction (J2) is created, an "outlet-junction" edge (E7) is created, and "junction-destination" edges (E8 and E9) are created.

In some embodiments, junction nodes and corresponding edges are created for the common inputs and common outputs of a grouped node. For example, with reference to the grouped node (G1) of FIG. 6D and its sub-nodes (N4, N5 and N6) (shown in FIGS. 6A and 6B), a group-input junction node (J3) may be created, the incoming edge (E4) may be connected to the group-input junction node (J3) to define an "group source" edge), and first, second and third "group-inlet" edges (E11, E12 and E13) may be generated that extend from the group-input junction node (J3) to respective inlets of the pump modes (N4, N5 and N6). Further, a group-output junction node (J4) may be created, the outgoing edge (E7) may be connected to the group-output junction node (J4) to define an "group destination" edge), and first, second and third "group-outlet" edges (E14, E15 and E16) may be generated that extend from respective outlets of the pump nodes (N4, N5 and N6) to the group-output junction node (J4).

FIG. 7C is a diagram that illustrates a corresponding edge-grouped process structural model 512 for the components of the industrial process 300 of FIG. 3 and the corresponding process structural model 204 of FIG. 4A in accordance with one or more embodiments. Consistent with the illustration of FIG. 6D (and the prior example), the edge-grouped process structural model 512 of FIG. 7C includes a listing similar to that of the equipment-grouped process structural model 508 of FIG. 7B, with the addition of the junctions and edges created by way of an edge grouping process described with regard to the edge-grouped process mapping 606 of FIG. 6D. For example, the edge-grouped process structural model 512 of FIG. 7C includes equipment information for the junctions created (e.g., for Junction1 (J1)-Junction4 (J4)) and for the edges created (e.g., for Edge1 (E1)-Edge16 (16)). Grouping connections (or "edges") to determine an edge-grouped process structural model 512 may include, for example, the control system 106 (or another operator of the facility 102) generating the edge-grouped process structural model 512 of FIG. 7C (or the edge-grouped process mapping 606 of FIG. 6D) based on the equipment-grouped process structural model 508 of FIG. 7A (or the equipment-grouped process mapping 604 of FIG. 6C) that defines the equipment-grouped components of the industrial process 300 of FIG. 3.

Figure 8:
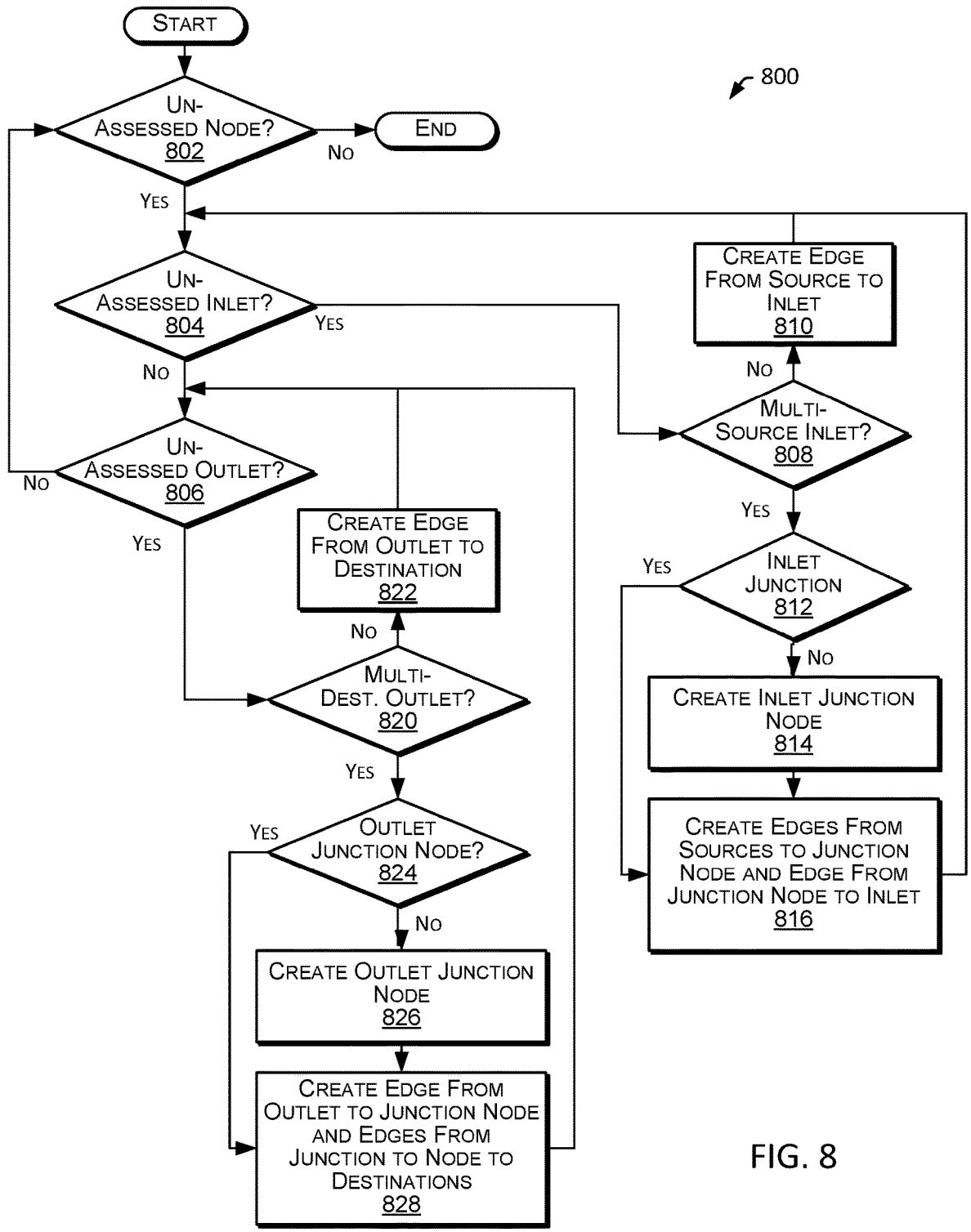
FIG. 8 is a flowchart that illustrates a method of edge-grouping to generate an edge-grouped process structural model in accordance with one or more embodiments.

FIG. 8 is a flowchart that illustrates a method 800 of generating an edge-grouped process structural model in accordance with one or more embodiments. In the context of the facility 102, the operations of method 800 may be performed, for example, by the control system 106 or another operator of the facility 102. Method 800 may include determining whether there are any un-assessed nodes (block 802), and, in response to determining that there is an un-assessed node, continuing to determine whether there is an un-assessed inlet of the node (block 804) or an unassessed outlet of the node (block 806). In response to determining that there is an un-assessed inlet of the node (block 804), method 800 may proceed to determining whether the un-assessed inlet of the node is a multi-source inlet (block 808). This may include, for example, determining whether the inlet of the node is connected to two or more sources (e.g., determining whether the inlet is connected to two or more outlets of other pieces of process equipment). In response to determining that the inlet of the node is not a multi-source inlet, method 800 may proceed to creating an edge from a source to the inlet of the node (e.g., creating an edge from an outlet of another node representing another piece of process equipment to the inlet of the node) (block 810). In response to determining that the inlet of the node is a multi-source inlet, method 800 may proceed to determining whether an inlet junction node exists for the inlet of the node (block 812). In response to determining that an inlet junction node does not exists for the inlet, method 800 may proceed to creating an inlet junction node for the inlet (block 814) and creating respective edges from the sources to the inlet junction node and creating an edge from the inlet junction node to the inlet of the node (block 816). This may include, for example, (a) generating an inlet junction node for the inlet, and (b) generating (in place of the two or more inlet connections/edges), (i) for each of the inlet connections/edges between a source (e.g., a corresponding outlet of another piece of process equipment) and the inlet, a source junction connection/edge that extends from the source to the inlet junction node, and (ii) a junction-inlet connection/edge that extends from the inlet junction node to the inlet of the node. In response to determining that an inlet junction node exists for the inlet, method 800 may proceed to creating respective edges from the sources (e.g., from the corresponding outlets other pieces of process equipment) to the inlet junction node and a creating edge from the inlet junction node to the inlet of the node (block 814). Following the creation of edges (block 810 or block 814) method 800 may include returning to checking for any un-assessed inlets of the node (block 804).

In response to determining that there is an un-assessed outlet of the node (block 806), method 800 may proceed to determining whether the un-assessed outlet of the node is a multi-destination outlet (block 820). This may include, for example, determining whether the outlet is connected to two or more destinations (e.g., determining whether the outlet is connected to two or more inlets of other pieces of process equipment). In response to determining that the outlet of the node is not a multi-destination outlet, method 800 may proceed to creating an edge from the outlet to the destination (e.g., creating an edge from the outlet of the node to an inlet of another node representing another piece of process equipment) (block 822). In response to determining that outlet of the node is a multi-destination outlet, method 800 may proceed to determining whether an outlet junction node exists for the outlet of the node (block 824). In response to determining that an outlet junction node does not exists for the inlet, method 800 may proceed to creating an outlet junction node for the inlet (block 826), and creating an edge from the outlet of the node to the outlet junction node and creating respective edges from the outlet junction node to the destinations (e.g., to the corresponding inlets of other pieces of process equipment) (block 828). This may include, for example, (a) generating an outlet junction node for the outlet, and (b) generating (in place of two or more outlet connections/edges) (i) an outlet-junction connection/edge that extends from the outlet of the node to the outlet junction node, and (ii) for each of the outlet connections between the outlet and a destination (e.g., a corresponding inlet of another piece of process equipment), a junction-destination connection/edge that extends from the outlet junction node to the destination. In response to determining that an outlet junction node exists for the inlet, method 800 may proceed to creating an edge from the outlet of the node to the outlet junction node and creating respective edges from the outlet junction node to the destinations (e.g., to the corresponding inlets of other pieces of process equipment) (block 828). Following the creation of edges (block 822 or block 828) method 800 may include returning to checking for any un-assessed outlets of the node (block 806).

In response to determining that there are no unassessed outlets (block 806), method 800 may include returning to checking for any un-assessed nodes (block 802). In response to determining that there is an unassessed node (block 802), method 800 may proceed to the assessment of the node (blocks 804-828). In response to determining that there is no unassessed node (e.g., all nodes have been assessed) (block 802), method 800 may end, having generated a corresponding edge-grouped process structural model 512 for the components of the industrial process. The generated edge-grouped process structural model 512 may be, for example, the edge-grouped process structural model 512 of FIG. 7C for the components of the industrial process 300 of FIG. 3 (or the corresponding edge-grouped process mapping 606 of FIG. 6D).

Returning to method 500 of FIG. 5, in some embodiments, method 500 may include incorporating interface model to determine a grouped process structural model 212 (block 514). This may include incorporating, into an edge-grouped process structural model 512 for an industrial process, the interface information of an interface model 208 for an interface application that will be used to render the display the PFD 108 for the industrial process. Continuing with the prior example, this may include incorporating, into the edge-grouped process structural model 512 of FIG. 7C for the industrial process 300 of FIG. 3, the interface information of the interface model 208 of FIG. 4B for the HMI application 110 that is intended to be used to render the display the PFD 108 for the industrial process 300 of FIG. 3.

FIG. 7D is a diagram that illustrates an example grouped process structural model 212 for the industrial process 300 of FIG. 3 in accordance with one or more embodiments. Consistent with the edge-grouped process structural model 512 of FIG. 7C and the interface model 208 of FIG. 4B, the grouped process structural model 212 of FIG. 7D includes a listing of process equipment information of the edge-grouped process structural model 512 of FIG. 7C, along with corresponding interface information of the interface model 208 that is embedded within corresponding sets of equipment information. Specifically, each equipment type definition for a piece of process equipment is followed by corresponding interface information for that equipment type. For example, the equipment type of "Inlet" for Inlet1 is immediately followed by corresponding interface information that defines an image for the piece of equipment (e.g., "Inlet.png"), associated image characteristics that include an image width, an image height and port constraints. Similar sets of interface information are embedded for each of the different pieces of process equipment to be represented, including the associated sensors.

Returning to method 200 of FIG. 2, in some embodiments, method 200 may include determining a routed process model 216 (block 214). This may include generating, based on a grouped process structural model 212 for an industrial process, a routed process model 216. For example, the grouped process structural model 212 for the industrial process 300 may be provided to a routing application that applies a routing algorithm to the grouped process structural model 212 to generate a corresponding routed process model 216 for the industrial process 300. The routed process model 216 may include layout and routing information for generation of a PFD 108 for the industrial process. For example, the routed process model 216 for the industrial process 300 may define display coordinates for each of the images defined in the grouped process structural model 212 of FIG. 7D, as well as defining coordinates for the respective edges defined in the grouped process structural model 212 of FIG. 7D.

FIG. 7E is a diagram that illustrates a corresponding routed process model 216 for the components of the industrial process 300 of FIG. 3 and the corresponding grouped process structural model 212 of FIG. 4D in accordance with one or more embodiments. For example, for each of the defined pieces of equipment, the routed process model 216 may include corresponding equipment routing information that includes an definition of the type (e.g., edge or node), equipment type (e.g., inlet, valve, vertical tank, cooler, pump, edge, or the like), an identifier (e.g., "Inlet1" or "Edge1"), and a textual description to be displayed (e.g., "Input 1"). For pieces of equipment associated with a node that is associated with an image to be displayed, the equipment routing information may include an image identifier for an image to be displayed (e.g., Inlet.png), an image size that defines the size of the image to be displayed (e.g., Width:20, Height:20), and an image location that defines the display location of the image to be displayed (e.g., display coordinates (X:92, Y:76)). For edge type equipment, the equipment routing information may include a source that defines a source at which the edge begins (e.g., Inlet1), a source port that defines a particular port of the source at which the edge begins (e.g., Inlet1_Out1), a source point that defines the display location of the start of the edge (e.g., display coordinates (X:172, Y:126)), a target (or destination) that defines a destination at which the edge ends (e.g., InletValve1), a target (or destination) port that defines a particular port of the destination at which the edge ends (e.g., InletValve1_In1), and a target (or destination) point that defines the display location of the end of the edge (e.g., display coordinates (X:277, Y:204)).

Figure 9A:
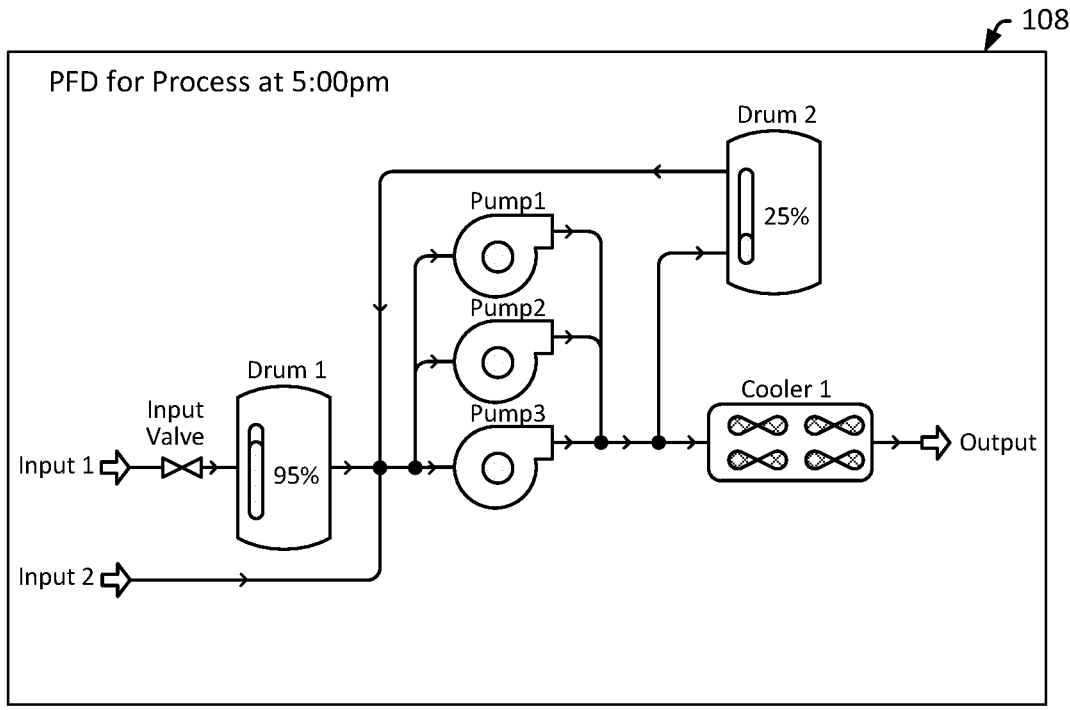
FIGS. 9A and 9B are diagrams that illustrate process flow diagrams (PFDs) in accordance with one or more embodiments.
Figure 9B:
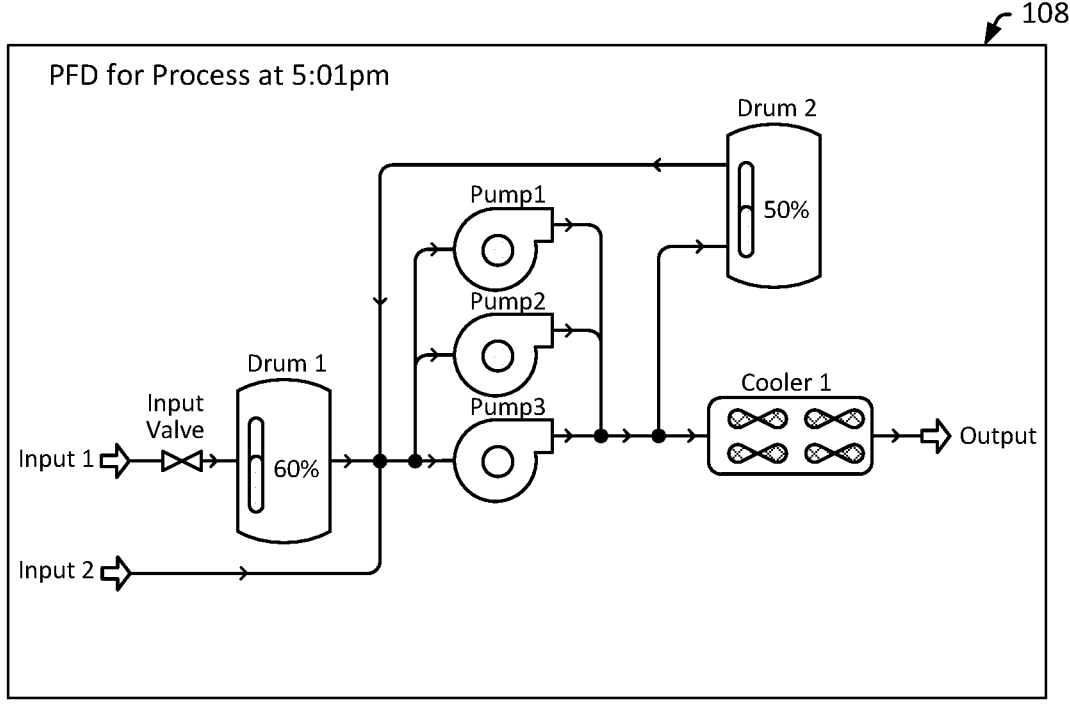

In some embodiments, method 200 includes presenting a routed process model (block 218). This may include, rendering a routed process model 216 for an industrial process to generate and display a PFD 108 for the industrial process. For example, the routed process model 216 for the industrial process 300 may be provided to a HMI application 110 that renders the routed process model 216 to generate a corresponding display of a PFD 108 for the industrial process 300 on a graphical user interface of the control system 106. FIG. 9A is a diagram that illustrates display of a PFD 108 for the industrial process 300 in accordance with one or more embodiments. In some embodiments, presenting a routed process model 216 includes monitoring the status of one or more process parameters of the process corresponding to the routed process model 216, and updating a display of the PFD 108 corresponding to the routed process model 216 to reflect the process parameters. For example, a SCADA system of the control system 106 may regularly (e.g., about every one second, every ten seconds, every minute, every ten minutes, or every hour) collect process parameters for the process 300, such as current levels of Drum1 and Drum2 from respective ones of the Drum1LevelSensor and the Drum2LevelSensor, the current operational states of Pump1, Pump2 and Pump3 from respective ones of the Pump1Sensor, the Pump2Sensor and the Pump3Sensor, the current operational states of Cooler1 from the Cooler1 sensor, and the control system 106 may cause an updated rendering of the PFD 108 such that the presented PFD 108 is updated to reflect the current process parameters for the process 300. For example, an image in the PFD 108 representing the level of Drum1 may be updated every second based on corresponding readings acquired from the Drum1LevelSensor (see, e.g., FIG. 9B which illustrates an updated display of the presented PFD 108 that reflects the changes in process parameters for the process 300). Such displayed PFDs 108 may provide a visual representation of the current operational status of the industrial process 300 of the facility 102. Further, such displayed PFDs 108 may enable a facility operator to determine operational procedures (e.g., close InletValve1) to be undertaken based on an assessment of the PFD 108 and, in turn, conduct those operational procedures to provide for effective and efficient operation of the process 300 and the facility 102.

Figure 10:
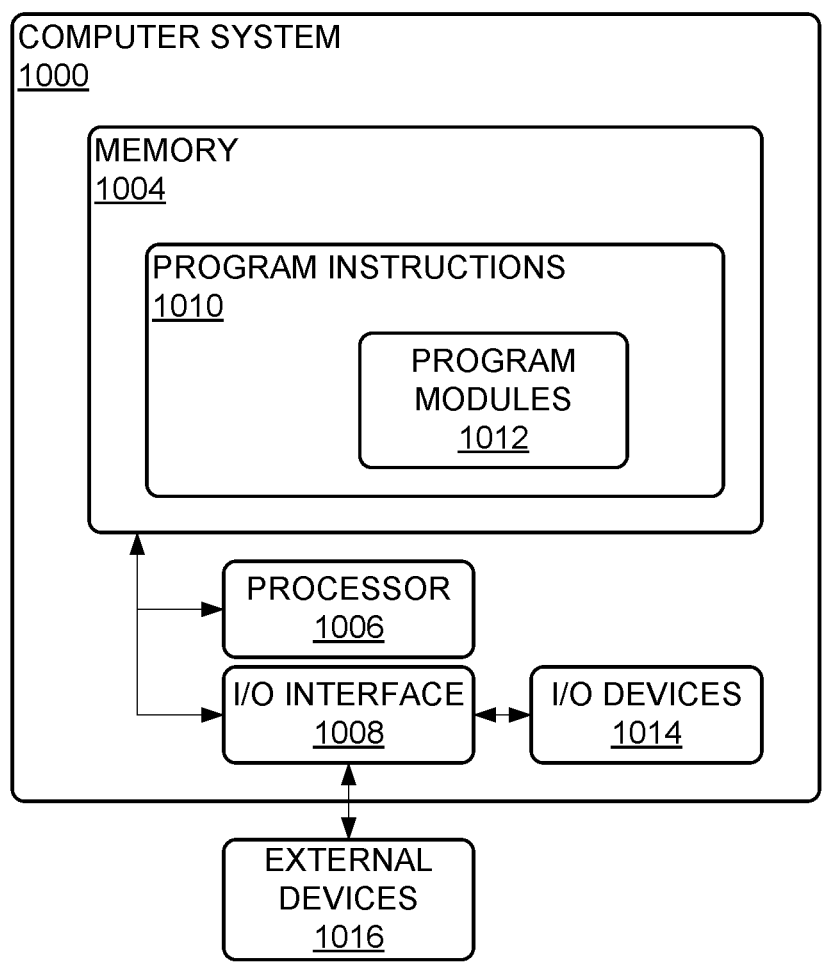
FIG. 10 is a diagram that illustrates an example computer system in accordance with one or more embodiments.

FIG. 10 is a diagram that illustrates an example computer system (or "system") 1000 in accordance with one or more embodiments. In some embodiments, the system 1000 is a programmable logic controller (PLC). The system 1000 may include a memory 1004, a processor 1006 and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (e.g., CD-ROM or DVD-ROM, hard drives). The memory 1004 may include a non-transitory computer-readable storage medium having program instructions 1010 stored thereon. The program instructions 1010 may include program modules 1012 that are executable by a computer processor (e.g., the processor 1006) to cause the functional operations described, such as those described with regard to the control system 106 or the method 200, 500 or 800.

The processor 1006 may be any suitable processor capable of executing program instructions. The processor 1006 may include a central processing unit (CPU) that carries out program instructions (e.g., the program instructions of the program modules 1012) to perform the arithmetical, logical, or input/output operations described. The processor 1006 may include one or more processors. The I/O interface 1008 may provide an interface for communication with one or more I/O devices 1014, such as a joystick, a computer mouse, a keyboard, or a display screen (for example, an electronic display for displaying a graphical user interface (GUI)). The I/O devices 1014 may include one or more of the user input devices. The I/O devices 1014 may be connected to the I/O interface 1008 by way of a wired connection (e.g., an Industrial Ethernet connection) or a wireless connection (e.g., a Wi-Fi connection). The I/O interface 1008 may provide an interface for communication with one or more external devices 1016. In some embodiments, the I/O interface 1008 includes one or both of an antenna and a transceiver. In some embodiments, the external devices 1016 include equipment sensors or controllers.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all of the portions of the processes and methods may be implemented by one or more of the processors/modules/applications described here.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method of controlling an industrial process of an industrial process facility, the method comprising:
   determining a process structural model that defines operational characteristics of pieces of equipment of an industrial process facility used to perform an industrial process, the process structural model comprising, for each piece of equipment to be represented in a process flow diagram (PFD) for the industrial process:
      an equipment type definition that defines an equipment type of the piece of equipment;
      a source definition that defines, for each resource stream to be received for processing by the piece of equipment:
         one or more outlets of one or more pieces of equipment in the industrial process facility from which the resource stream is provided; and
         an inlet of the piece of equipment at which the resource stream is to be received for processing by the piece of equipment;
      a destination definition that defines, for each resource stream to be output by the piece of equipment:
         an outlet of the piece of equipment from which the resource stream is to be output; and
         one or more inlets of one or more pieces of equipment in the industrial process facility to which the resource stream is to be provided; and
      a sensor definition that defines any sensors configured to sense characteristics of the processing by the piece of equipment and a corresponding sensor type for each of the any sensors;
   determining an interface application to display the PFD for the industrial process;
   obtaining, in response to determining the interface application to display the PFD for the industrial process, an interface model for the interface application, the interface model defining, for each equipment type of the process structural model, interface information that comprises:
      an equipment image associated with the equipment type; and
      display characteristics for the equipment image associated with the equipment type;
   determining, based on the process structural model for the industrial process, a grouped process structural model for the industrial process, the determining of the grouped process structural model comprising:
      grouping, based on the process structural model for the industrial process, sensors with associated process equipment to determine a sensor-grouped process structural model for the industrial process;
      grouping, based on the sensor-grouped process structural model for the industrial process, process equipment to determine an equipment-grouped process structural model for the industrial process;
      grouping, based on the equipment-grouped process structural model for the industrial process, connections between pieces of equipment to determine an edge-grouped process structural model for the industrial process; and incorporating the interface model for the interface application with the edge-grouped process structural model for the industrial process to determine the grouped process structural model;

determining, based on the grouped process structural model for the industrial process, a routed process model for the industrial process;

generating, based on the routed process model for the industrial process, the PFD for the industrial process;

determining, based on the PFD for the industrial process, a process parameter for the industrial process; and controlling the industrial process to implement the process parameter.

2. The method of claim 1, wherein the grouping of sensors with associated process equipment to determine the sensor-grouped process structural model for the industrial process comprises:

for each piece of equipment to be represented in the PFD for the industrial process:
for each of any sensors identified in the sensor definition for the piece of equipment, associating sensor equipment information for the sensor as a sub-node of equipment information for the piece of process equipment.

3. The method of claim 1, wherein the grouping of process equipment to determine the equipment-grouped process structural model for the industrial process comprises:

identifying pieces of process equipment having the same input and outputs; and generating a grouped node that comprises the equipment information for the pieces of process equipment having the same inputs and outputs.

4. The method of claim 1, wherein grouping connections between pieces of equipment to determine an edge-grouped process structural model for the industrial process comprises:

for each inlet of a piece of equipment:
determining whether the inlet is connected to two or more sources; and
in response to determining that the inlet is connected to two or more sources:
generating an inlet junction node for the inlet;
generating, for each of the inlet connections between a source and the inlet, a source-junction connection that extends from the source to the inlet junction node; and
generating a junction-inlet connection that extends from the inlet junction node to the inlet of the piece of equipment; and for each outlet of a piece of equipment:
determining whether the outlet is connected to two or more destinations; and
in response to determining that the outlet is connected to two or more destinations, generating an outlet junction node for the outlet;
generating an outlet-junction connection that extends from the outlet of the piece of equipment to the outlet junction node; and
generating, for each of the outlet connections between the outlet and a destination, a junction-destination connection that extends from the outlet junction node to the destination.

5. The method of claim 1, wherein incorporating the interface model for the interface application with the edge-grouped process structural model for the industrial process to determine the grouped process structural model comprises:

for each set of equipment information of the edge-grouped process structural model:
identifying an equipment type associated with the equipment information;
identifying interface information of the interface model that is associated with the equipment type; and
associating the interface information with the set of equipment information.

6. The method of claim 1,
wherein determining the routed process model for the industrial process comprises identification of display locations for images representing each piece of equipment to be represented in the PFD for the industrial process, and
wherein generating the PFD for the industrial process comprises displaying the images representing each piece of equipment in accordance with the display locations identified by the routed process model.

7. The method of claim 1, wherein generating the PFD for the industrial process comprises:
obtaining a first set of process parameters corresponding to conditions of the industrial process at a first point in time;
displaying the images representing each piece of equipment in accordance with the display locations identified by the routed process model, wherein images associated with the sensors reflect the first set of process parameters;
obtaining a second set of process parameters corresponding to conditions of the industrial process at a second point in time; and
in response to obtaining a second set of process parameters corresponding to conditions of the industrial process at a second point in time, updating the display of the images associated with the sensors to reflect the second set of process parameters.

8. A system for controlling an industrial process of an industrial process facility, the system comprising:
a processor; and
a non-transitory computer readable storage medium comprising program instructions stored thereon that are executable by the processor to perform the following operations for monitoring an industrial process of an industrial process facility:
determining a process structural model that defines operational characteristics of pieces of equipment of an industrial process facility used to perform an industrial process, the process structural model comprising, for each piece of equipment to be represented in a process flow diagram (PFD) for the industrial process:
an equipment type definition that defines an equipment type of the piece of equipment;
a source definition that defines, for each resource stream to be received for processing by the piece of equipment:
one or more outlets of one or more pieces of equipment in the industrial process facility from which the resource stream is provided; and
an inlet of the piece of equipment at which the resource stream is to be received for processing by the piece of equipment;

a destination definition that defines, for each resource stream to be output by the piece of equipment:
an outlet of the piece of equipment from which the resource stream is to be output; and
one or more inlets of one or more pieces of equipment in the industrial process facility to which the resource stream is to be provided; and
a sensor definition that defines any sensors configured to sense characteristics of the processing by the piece of equipment and a corresponding sensor type for each of the any sensors;
determining an interface application to display the PFD for the industrial process;
obtaining, in response to determining the interface application to display the PFD for the industrial process, an interface model for the interface application, the interface model defining, for each equipment type of the process structural model, interface information that comprises:
an equipment image associated with the equipment type; and
display characteristics for the equipment image associated with the equipment type;
determining, based on the process structural model for the industrial process, a grouped process structural model for the industrial process, the determining of the grouped process structural model comprising:
grouping, based on the process structural model for the industrial process, sensors with associated process equipment to determine a sensor-grouped process structural model for the industrial process;
grouping, based on the sensor-grouped process structural model for the industrial process, process equipment to determine an equipment-grouped process structural model for the industrial process;
grouping, based on the equipment-grouped process structural model for the industrial process, connections between pieces of equipment to determine an edge-grouped process structural model for the industrial process; and
incorporating the interface model for the interface application with the edge-grouped process structural model for the industrial process to determine the grouped process structural model;
determining, based on the grouped process structural model for the industrial process, a routed process model for the industrial process;
generating, based on the routed process model for the industrial process, the PFD for the industrial process;
determining, based on the PFD for the industrial process, a process parameter for the industrial process; and
controlling the industrial process to implement the process parameter.

9. The system of claim 8, wherein the grouping of sensors with associated process equipment to determine the sensor-grouped process structural model for the industrial process comprises:
for each piece of equipment to be represented in the PFD for the industrial process:
for each of any sensors identified in the sensor definition for the piece of equipment, associating sensor equipment information for the sensor as a sub-node of equipment information for the piece of process equipment.

10. The system of claim 8, wherein the grouping of process equipment to determine the equipment-grouped process structural model for the industrial process comprises:
identifying pieces of process equipment having the same input and outputs; and
generating a grouped node that comprises the equipment information for the pieces of process equipment having the same inputs and outputs.

11. The system of claim 8, wherein grouping connections between pieces of equipment to determine an edge-grouped process structural model for the industrial process comprises:
for each inlet of a piece of equipment:
determining whether the inlet is connected to two or more sources; and
in response to determining that the inlet is connected to two or more sources:
generating an inlet junction node for the inlet;
generating, for each of the inlet connections between a source and the inlet, a source-junction connection that extends from the source to the inlet junction node; and
generating a junction-inlet connection that extends from the inlet junction node to the inlet of the piece of equipment; and
for each outlet of a piece of equipment:
determining whether the outlet is connected to two or more destinations; and
in response to determining that the outlet is connected to two or more destinations, generating an outlet junction node for the outlet;
generating an outlet-junction connection that extends from the outlet of the piece of equipment to the outlet junction node; and
generating, for each of the outlet connections between the outlet and a destination, a junction-destination connection that extends from the outlet junction node to the destination.

12. The system of claim 8, wherein incorporating the interface model for the interface application with the edge-grouped process structural model for the industrial process to determine the grouped process structural model comprises:
for each set of equipment information of the edge-grouped process structural model:
identifying an equipment type associated with the equipment information;
identifying interface information of the interface model that is associated with the equipment type; and
associating the interface information with the set of equipment information.

13. The system of claim 8,
wherein determining the routed process model for the industrial process comprises identification of display locations for images representing each piece of equipment to be represented in the PFD for the industrial process, and
wherein generating the PFD for the industrial process comprises displaying the images representing each piece of equipment in accordance with the display locations identified by the routed process model.

14. The system of claim 8, wherein generating the PFD for the industrial process comprises:
obtaining a first set of process parameters corresponding to conditions of the industrial process at a first point in time;

displaying the images representing each piece of equipment in accordance with the display locations identified by the routed process model, wherein images associated with the sensors reflect the first set of process parameters;

obtaining a second set of process parameters corresponding to conditions of the industrial process at a second point in time; and in response to obtaining a second set of process parameters corresponding to conditions of the industrial process at a second point in time, updating the display of the images associated with the sensors to reflect the second set of process parameters.

15. A non-transitory computer readable storage medium comprising program instructions stored thereon that are executable by a processor to perform the following operations for controlling an industrial process of an industrial process facility:

determining a process structural model that defines operational characteristics of pieces of equipment of an industrial process facility used to perform an industrial process, the process structural model comprising, for each piece of equipment to be represented in a process flow diagram (PFD) for the industrial process:

an equipment type definition that defines an equipment type of the piece of equipment;

a source definition that defines, for each resource stream to be received for processing by the piece of equipment:

one or more outlets of one or more pieces of equipment in the industrial process facility from which the resource stream is provided; and an inlet of the piece of equipment at which the resource stream is to be received for processing by the piece of equipment;

a destination definition that defines, for each resource stream to be output by the piece of equipment:

an outlet of the piece of equipment from which the resource stream is to be output; and one or more inlets of one or more pieces of equipment in the industrial process facility to which the resource stream is to be provided; and a sensor definition that defines any sensors configured to sense characteristics of the processing by the piece of equipment and a corresponding sensor type for each of the any sensors;

determining an interface application to display the PFD for the industrial process;

obtaining, in response to determining the interface application to display the PFD for the industrial process, an interface model for the interface application, the interface model defining, for each equipment type of the process structural model, interface information that comprises:

an equipment image associated with the equipment type; and display characteristics for the equipment image associated with the equipment type;

determining, based on the process structural model for the industrial process, a grouped process structural model for the industrial process, the determining of the grouped process structural model comprising:

grouping, based on the process structural model for the industrial process, sensors with associated process equipment to determine a sensor-grouped process structural model for the industrial process;

grouping, based on the sensor-grouped process structural model for the industrial process, process equipment to determine an equipment-grouped process structural model for the industrial process;

grouping, based on the equipment-grouped process structural model for the industrial process, connections between pieces of equipment to determine an edge-grouped process structural model for the industrial process; and incorporating the interface model for the interface application with the edge-grouped process structural model for the industrial process to determine the grouped process structural model;

determining, based on the grouped process structural model for the industrial process, a routed process model for the industrial process;

generating, based on the routed process model for the industrial process, the PFD for the industrial process;

determining, based on the PFD for the industrial process, a process parameter for the industrial process; and controlling the industrial process to implement the process parameter.

16. The medium of claim 15, wherein the grouping of sensors with associated process equipment to determine the sensor-grouped process structural model for the industrial process comprises:

for each piece of equipment to be represented in the PFD for the industrial process:

for each of any sensors identified in the sensor definition for the piece of equipment, associating sensor equipment information for the sensor as a sub-node of equipment information for the piece of process equipment.

17. The medium of claim 15, wherein the grouping of process equipment to determine the equipment-grouped process structural model for the industrial process comprises:

identifying pieces of process equipment having the same input and outputs; and generating a grouped node that comprises the equipment information for the pieces of process equipment having the same inputs and outputs.

18. The medium of claim 15, wherein grouping connections between pieces of equipment to determine an edge-grouped process structural model for the industrial process comprises:

for each inlet of a piece of equipment:

determining whether the inlet is connected to two or more sources; and in response to determining that the inlet is connected to two or more sources:

generating an inlet junction node for the inlet;

generating, for each of the inlet connections between a source and the inlet, a source-junction connection that extends from the source to the inlet junction node; and generating a junction-inlet connection that extends from the inlet junction node to the inlet of the piece of equipment; and for each outlet of a piece of equipment:

determining whether the outlet is connected to two or more destinations; and in response to determining that the outlet is connected to two or more destinations, generating an outlet junction node for the outlet;

generating an outlet-junction connection that extends from the outlet of the piece of equipment to the outlet junction node; and generating, for each of the outlet connections between the outlet and a destination, a junction-destination connection that extends from the outlet junction node to the destination.

19. The medium of claim 15, wherein incorporating the interface model for the interface application with the edge-grouped process structural model for the industrial process to determine the grouped process structural model comprises:

for each set of equipment information of the edge-grouped process structural model:
identifying an equipment type associated with the equipment information;
identifying interface information of the interface model that is associated with the equipment type; and
associating the interface information with the set of equipment information.

20. The medium of claim 15,
wherein determining the routed process model for the industrial process comprises identification of display locations for images representing each piece of equipment to be represented in the PFD for the industrial process, and wherein generating the PFD for the industrial process comprises displaying the images representing each piece of equipment in accordance with the display locations identified by the routed process model.

21. The medium of claim 15, wherein generating the PFD for the industrial process comprises:

obtaining a first set of process parameters corresponding to conditions of the industrial process at a first point in time;

displaying the images representing each piece of equipment in accordance with the display locations identified by the routed process model, wherein images associated with the sensors reflect the first set of process parameters;

obtaining a second set of process parameters corresponding to conditions of the industrial process at a second point in time; and in response to obtaining a second set of process parameters corresponding to conditions of the industrial process at a second point in time, updating the display of the images associated with the sensors to reflect the second set of process parameters.

* * * * *